United States Patent
Shaked et al.

(10) Patent No.: US 12,520,183 B2
(45) Date of Patent: Jan. 6, 2026

(54) REPORT MESSAGE FOR INDICATING NON-LINEARITY CANCELATION CAPABILITY

(71) Applicant: QUALCOMM Incorporated, San Diego, CA (US)

(72) Inventors: Ronen Shaked, Kfar Saba (IL); Aviv Regev, Tel Aviv (IL); Yaniv Eistein, Tel Aviv (IL); Matan Leilien, Hertzelita (IL)

(73) Assignee: Qualcomm Incorporated, San Diego, CA (US)

( * ) Notice: Subject to any disclaimer, the term of this patent is extended or adjusted under 35 U.S.C. 154(b) by 348 days.

(21) Appl. No.: 18/303,546

(22) Filed: Apr. 19, 2023

(65) Prior Publication Data

US 2024/0357395 A1    Oct. 24, 2024

(51) Int. Cl.
*H04W 24/10*    (2009.01)
*H04B 17/318*   (2015.01)
*H04L 5/00*     (2006.01)

(52) U.S. Cl.
CPC .......... *H04W 24/10* (2013.01); *H04B 17/328* (2023.05); *H04L 5/0051* (2013.01)

(58) Field of Classification Search
CPC ....... H04W 24/10; H04W 52/52; H04W 8/24; H04B 17/328; H04B 1/10; H04L 5/0051; H04L 1/0026

See application file for complete search history.

(56) References Cited

U.S. PATENT DOCUMENTS

2021/0344367 A1    11/2021  Wolf et al.
2023/0006765 A1*    1/2023  Kutz ..................... H04L 1/0033

FOREIGN PATENT DOCUMENTS

WO    WO-2023107786 A1    6/2023

OTHER PUBLICATIONS

International Search Report and Written Opinion—PCT/US2024/022471—ISA/EPO—Jul. 12, 2024.

* cited by examiner

*Primary Examiner* — Chuong A Ngo
(74) *Attorney, Agent, or Firm* — Holland & Hart LLP

(57) ABSTRACT

Methods, systems, and devices are described that support a report message for indicating non-linearity cancelation capability. A user equipment (UE) may receive one or more references signals from a network entity, where the reference signals are associated with a downlink resource allocation. The UE may measure a link quality metric for the reference signals. The UE may transmit a report message that includes at least a parameter indicating a non-linearity threshold associated with a capability of the UE to process non-linearity of downlink signals, where the parameter is based on the link quality metric and one or more characteristics of the downlink resource allocation. The network entity may receive the report message and transmit one or more downlink messages in accordance with the downlink resource allocation and based on the parameter.

26 Claims, 16 Drawing Sheets

REPORT MESSAGE FOR INDICATING NON-LINEARITY CANCELATION CAPABILITY

FIELD OF TECHNOLOGY

The following relates to wireless communications, including a report message for indicating non-linearity cancelation capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may communicate with a network. The network may transmit references signals to the UE, which may be used by the UE to determine characteristics of the reference signals, among other information.

SUMMARY

The described techniques relate to improved methods, systems, devices, and apparatuses that support a report message for indicating non-linearity cancelation capability. For example, the described techniques provide for indicating user equipment (UE) non-linearity reduction capability. The non-linearity reduction capability may indicate a threshold describing the extent to which the UE can cancel or reduce the non-linearities of the signal received from a network entity while maintaining a link quality above a threshold. The capability may be included in a report message, such as an extended channel state feedback (CSF) report, as a parameter. In some examples, the capability may be transmitted separately. The UE may have a look-up table or other data storage structure for storing and retrieving the maximum sustainable non-linearity reduction capability for multiple parameter combinations (e.g., modulation, allocation bandwidth, link SNR, etc.). Based on the table, the UE may retrieve a value of the parameter indicating the UE's non-linearity reduction capability. The UE may indicate the capability to a network device (e.g., a network entity). The network device may receive the report and change (e.g., reduce) supply voltage to the power amplifiers based on the capability reported, thus resulting in reduced power consumption of the network device.

A method for wireless communications at a UE is described. The method may include measuring a link quality metric for one or more reference signals associated with a downlink resource allocation, transmitting a report message that includes at least a parameter indicating a non-linearity threshold associated with a capability of the UE to process non-linearity of downlink signals, where the parameter is based on the link quality metric and one or more characteristics of the downlink resource allocation, and receiving one or more downlink messages in accordance with the downlink resource allocation and based on the parameter.

An apparatus for wireless communications at a UE is described. The apparatus may include a processor, memory coupled with the processor, and instructions stored in the memory. The instructions may be executable by the processor to cause the apparatus to measure a link quality metric for one or more reference signals associated with a downlink resource allocation, transmit a report message that includes at least a parameter indicating a non-linearity threshold associated with a capability of the UE to process non-linearity of downlink signals, where the parameter is based on the link quality metric and one or more characteristics of the downlink resource allocation, and receive one or more downlink messages in accordance with the downlink resource allocation and based on the parameter.

Another apparatus for wireless communications at a UE is described. The apparatus may include means for measuring a link quality metric for one or more reference signals associated with a downlink resource allocation, means for transmitting a report message that includes at least a parameter indicating a non-linearity threshold associated with a capability of the UE to process non-linearity of downlink signals, where the parameter is based on the link quality metric and one or more characteristics of the downlink resource allocation, and means for receiving one or more downlink messages in accordance with the downlink resource allocation and based on the parameter.

A non-transitory computer-readable medium storing code for wireless communications at a UE is described. The code may include instructions executable by a processor to measure a link quality metric for one or more reference signals associated with a downlink resource allocation, transmit a report message that includes at least a parameter indicating a non-linearity threshold associated with a capability of the UE to process non-linearity of downlink signals, where the parameter is based on the link quality metric and one or more characteristics of the downlink resource allocation, and receive one or more downlink messages in accordance with the downlink resource allocation and based on the parameter.

Some examples of the method, apparatuses, and non-transitory computer-readable medium described herein may further include operations, features, means, or instructions for transmitting an indication of a capability of the UE to receive the one or more reference signals according to a first mode or a second mode, where the first mode may be associated with a network entity transmitting reference signals with a first power level, and where the second mode may be associated with the network entity transmitting reference signals with a second power level that may be less than the first power level and receiving the reference signals according to the first mode or the second mode.

Some examples of the method, apparatuses, and non-transitory computer-readable medium described herein may further include operations, features, means, or instructions for receiving the reference signals according to the first mode includes calculating the link quality metric without performing a non-linearity cancellation process on the reference signals.

Some examples of the method, apparatuses, and non-transitory computer-readable medium described herein may further include operations, features, means, or instructions for receiving the reference signals according to the second mode includes calculating the link quality metric after performing a non-linearity cancellation process on the reference signals.

Some examples of the method, apparatuses, and non-transitory computer-readable medium described herein may further include operations, features, means, or instructions for retrieving a value of the parameter from a table including a set of multiple values of the link quality metric and a set of multiple values of the one or more characteristics of the downlink resource allocation.

In some examples of the method, apparatuses, and non-transitory computer-readable medium described herein, the report message includes a channel state feedback (CSF) report and the CSF report includes a channel quality indicator, a precoding matrix indicator, a rank indicator, or a combination thereof.

In some examples of the method, apparatuses, and non-transitory computer-readable medium described herein, the non-linearity threshold may be associated with the capability of the UE to process a maximum amount of non-linearity of downlink signals while maintaining a threshold signal-to-noise ratio loss.

In some examples of the method, apparatuses, and non-transitory computer-readable medium described herein, the capability of the UE to process non-linearity of downlink signals may be based on a capability of an in-band non-linearity cancellation algorithm of the UE.

In some examples of the method, apparatuses, and non-transitory computer-readable medium described herein, the one or more characteristics of the downlink resource allocation includes a modulation associated with the downlink resource allocation, an allocation bandwidth of the downlink resource allocation, or a combination thereof.

In some examples of the method, apparatuses, and non-transitory computer-readable medium described herein, the link quality metric includes a link signal-to-noise ratio.

A method for wireless communications at a network entity is described. The method may include transmitting one or more reference signals associated with a downlink resource allocation, receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE, and transmitting one or more downlink messages in accordance with the downlink resource allocation and based on the parameter.

An apparatus for wireless communications at a network entity is described. The apparatus may include a processor, memory coupled with the processor, and instructions stored in the memory. The instructions may be executable by the processor to cause the apparatus to transmit one or more reference signals associated with a downlink resource allocation, receive, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE, and transmit one or more downlink messages in accordance with the downlink resource allocation and based on the parameter.

Another apparatus for wireless communications at a network entity is described. The apparatus may include means for transmitting one or more reference signals associated with a downlink resource allocation, means for receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE, and means for transmitting one or more downlink messages in accordance with the downlink resource allocation and based on the parameter.

A non-transitory computer-readable medium storing code for wireless communications at a network entity is described. The code may include instructions executable by a processor to transmit one or more reference signals associated with a downlink resource allocation, receive, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE, and transmit one or more downlink messages in accordance with the downlink resource allocation and based on the parameter.

Some examples of the method, apparatuses, and non-transitory computer-readable medium described herein may further include operations, features, means, or instructions for receiving an indication of a capability of the UE to receive the one or more reference signals according to a first mode or a second mode, where the first mode may be associated with the network entity transmitting reference signals with a first power level, and where the second mode may be associated with the network entity transmitting reference signals with a second power level that may be less than the first power level and transmitting the reference signals according to the first mode or the second mode.

In some examples of the method, apparatuses, and non-transitory computer-readable medium described herein, the report message includes a channel state feedback (CSF) report and the CSF report includes a channel quality indicator, a precoding matrix indicator, a rank indicator, or a combination thereof.

In some examples of the method, apparatuses, and non-transitory computer-readable medium described herein, the non-linearity threshold may be associated with the capability of the UE to process a maximum amount of non-linearity of downlink signals while maintaining a threshold signal to noise ratio loss.

In some examples of the method, apparatuses, and non-transitory computer-readable medium described herein, the capability of the UE to process non-linearity of downlink signals may be based on a capability of an in-band non-linearity cancellation algorithm of the UE.

In some examples of the method, apparatuses, and non-transitory computer-readable medium described herein, the one or more characteristics of the downlink resource allocation includes a modulation associated with the downlink resource allocation, an allocation bandwidth of the downlink resource allocation, or a combination thereof.

In some examples of the method, apparatuses, and non-transitory computer-readable medium described herein, the link quality metric includes a link signal-to-noise ratio.

Some examples of the method, apparatuses, and non-transitory computer-readable medium described herein may further include operations, features, means, or instructions for adjusting a power level of one or more power amplifiers at the network entity based on the parameter.

DETAILED DESCRIPTION

Communications between devices, such as a wireless device (e.g., user equipment (UE)) and a network device (e.g., network entity), consumes power. For example, a network entity may have one or more power amplifiers that consume power. A network entity may use a power amplifier to amplify a signal, such as a radio frequency signal, which may result in non-linearities in the signal. A power amplifier may be configured to increase the signal while maintaining signal quality (e.g., reducing non-linearities), which may reduce the signal-to-noise (SNR) ratio. Increasing signal quality may increase power consumption, such as in the case of higher modulation orders. In some examples, a UE receiving a signal from a network entity may perform signal processing operations to reduce non-linearity of the received signal. As such, methods to reduce power consumption at network entities (e.g., by reducing power consumption of power amplifiers) may be beneficial to wireless communications networks.

Techniques described herein may provide for indicating, to a network entity, UE non-linearity reduction capability. For example, the non-linearity reduction capability may be included in an extended channel state feedback (CSF) report as a parameter, or may be transmitted separately. The capability may be transmitted as parameter (e.g., MaxNonLinearity) indicating a threshold describing the extent to which the UE may cancel (or reduce) the non-linearities of the signal received from the network entity while maintaining link quality (e.g., above a threshold). The UE may have a look-up table storing the maximum sustainable non-linearity reduction capability as a function of one or more parameters (e.g., modulation, allocation bandwidth, link SNR, etc.). Based on the table, the UE may retrieve a value of the parameter indicating the UE's non-linearity reduction capability, and transmit the value as a part of a report. The network entity may receive the report and reduce supply voltage to one or more of its electrical components (e.g., the power amplifiers) based on the capability reported, thus resulting in reduced power consumption at the network entity.

Aspects of the disclosure are initially described in the context of wireless communications systems. Aspects of the disclosure are illustrated by and described with reference to a signal power diagram and process flow. Aspects of the disclosure are further illustrated by and described with reference to apparatus diagrams, system diagrams, and flowcharts that relate to report messaging for indicating non-linearity cancelation capability.

Figure 1:
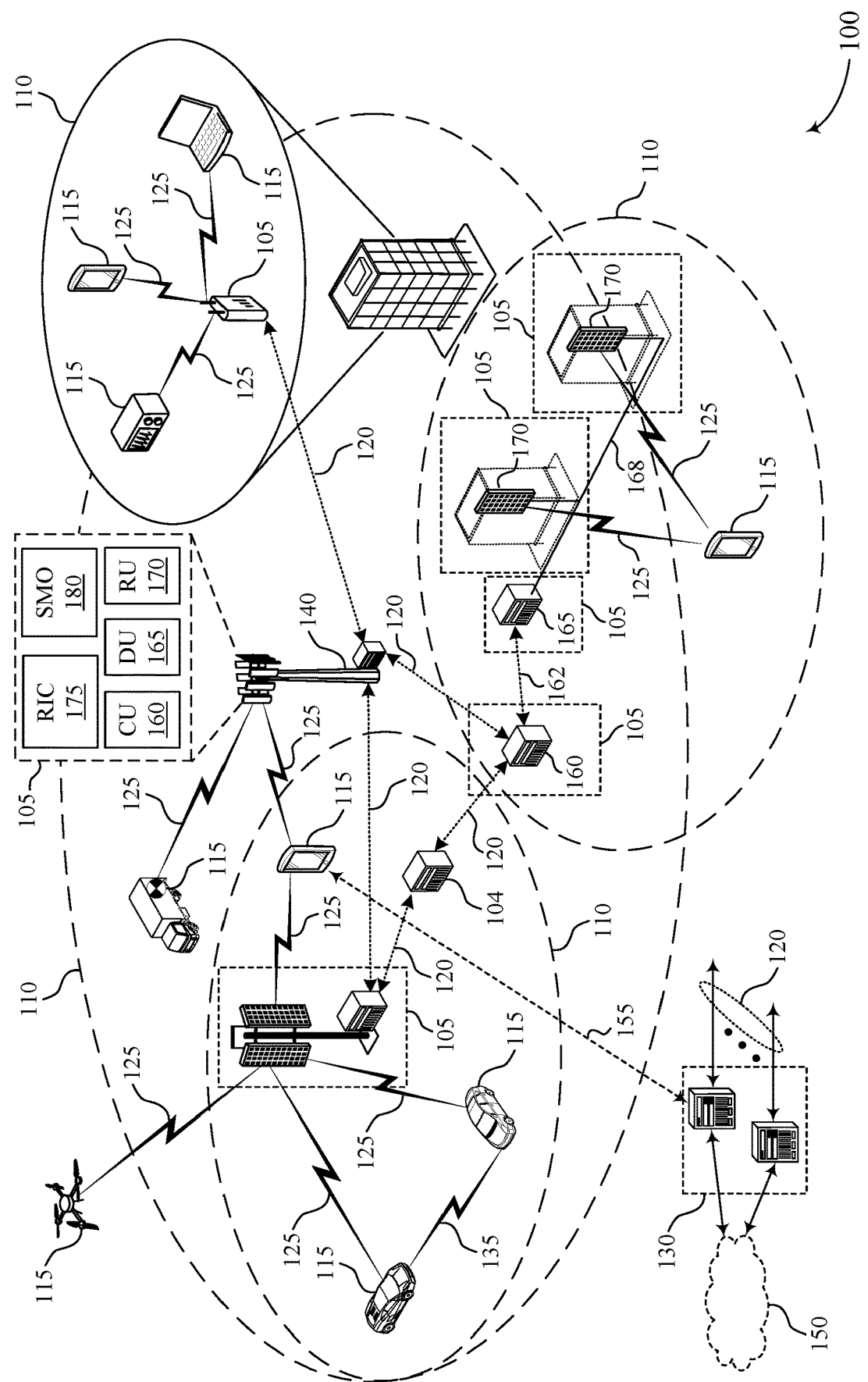
FIG. 1 shows an example of a wireless communications system that supports report messaging for indicating non-linearity cancelation capability in accordance with one or more aspects of the present disclosure.

FIG. 1 shows an example of a wireless communications system 100 that supports report messaging for indicating non-linearity cancelation capability in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support report messaging for indicating non-linearity cancelation capability as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Techniques described herein provide for indicating UE 115 non-linearity reduction capability. For example, the non-linearity reduction capability may be included in uplink messaging, including but not limited to an extended channel state feedback (CSF) report as a parameter, or may be transmitted separately. The capability may be transmitted as a parameter (e.g., MaxNonLinearity) indicating a threshold describing the extent to which the UE 115 may cancel the non-linearities of the signal received from the network entity 105 while maintaining link quality (e.g., above a threshold). The UE 115 may have a look-up table or similar data structure for storing the maximum sustainable non-linearity reduction capability based on multiple parameters (e.g., modulation, allocation bandwidth, link SNR, etc.). Based on the table, the UE 115 may retrieve a value of the parameter indicating the UE's 115 non-linearity reduction capability, and transmit the value as a part of a report (e.g., CSF report). The network entity 105 may receive the report and reduce supply voltage to the power amplifiers or other circuitry based on the capability reported, thus resulting in reduced power consumption at the network entity 105 and/or across the wireless communications system 100.

Figure 2:
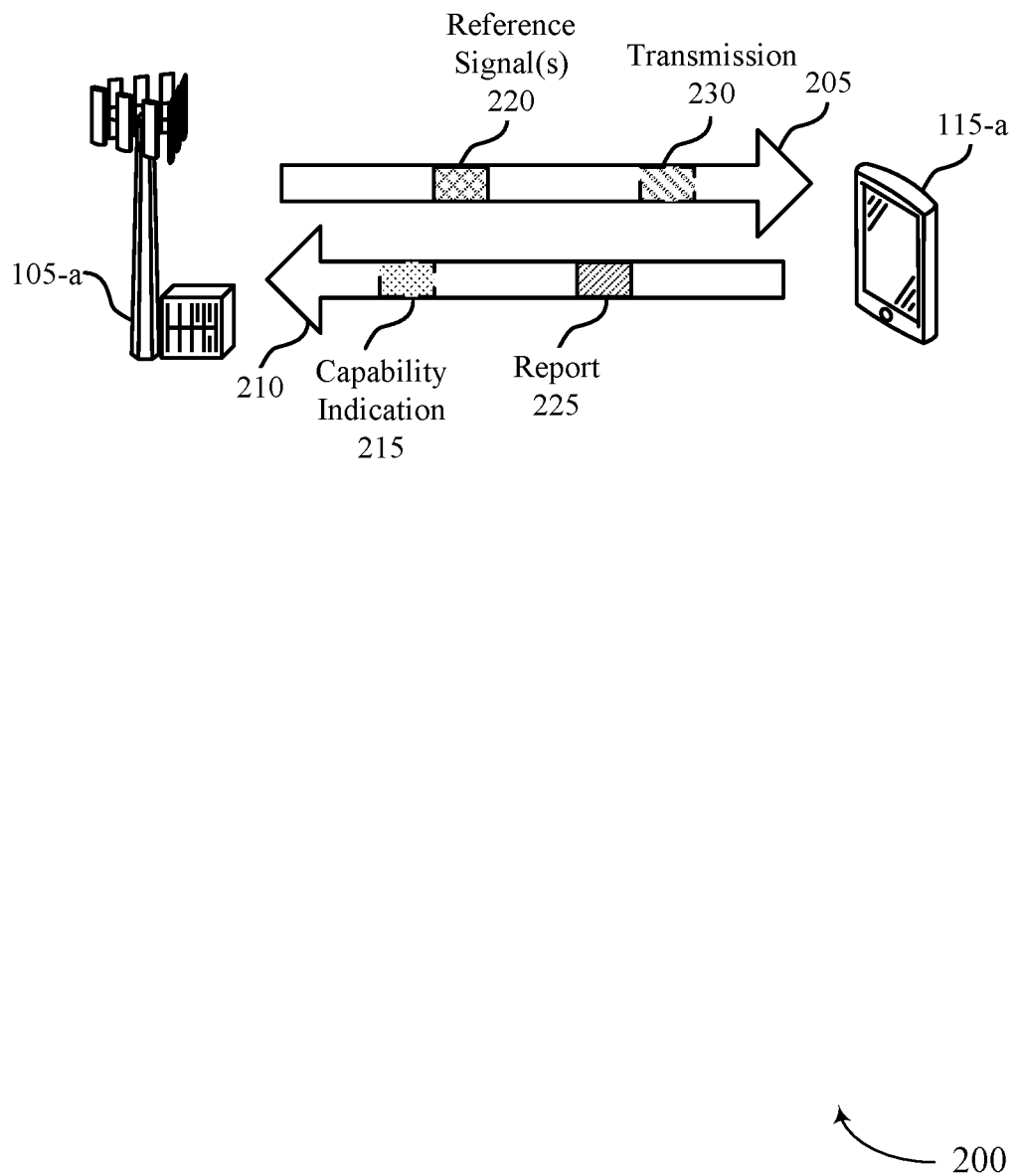
FIG. 2 shows an example of a wireless communication system that supports report messaging for indicating non-linearity cancelation capability in accordance with one or more aspects of the present disclosure.

FIG. 2 shows an example of a wireless communication system 200 that supports report messaging for indicating non-linearity cancelation capability in accordance with one or more aspects of the present disclosure. The wireless communication system 200 illustrates communications between the UE 115-a, which may be an example of the UE 115 as described with reference to FIG. 1, and the network entity 105-a, which may be an example of the network entity 105 as described with reference to FIG. 1. The example in FIG. 2 may include implementation of additional aspects described with reference to FIG. 1. The network entity 105-a may communicate (e.g., transmit, output) with the UE 115-a via a communication link 205 (e.g., a downlink channel, a physical downlink control channel (PDCCH), a physical downlink shared channel (PDSCH), among other examples). The UE 115-a may communicate (e.g., transmit, output) with the network entity 105-a via a communication link 210 (e.g., an uplink channel, a physical uplink control channel (PUCCH), a physical uplink shared channel (PUSCH), among other examples).

The UE 115-a may transmit a capability indication 215 to the network entity 105-a. The network entity 105-a may transmit one or more references signal 220 to the UE 115-a based on the capability indication 215. The UE 115-a may measure the reference signals 220, and transmit a report 225 including a parameter indicating a non-linearity threshold associated with the capability of the UE 115-a to process (e.g., reduce, cancel, mitigate) the non-linearity of downlink signals. The network entity 105-a may transmit a transmission 230 (e.g., a downlink signal) based on the report 225.

The network entity 105-a may have various electrical components including one or more power amplifiers, among other examples. In some systems, the power amplifiers may be one of the largest consumers of power, and power amplifier efficiency (PAE) may be very low (e.g., 25-30%). Techniques described herein provide for the report 225 (e.g., a CSF report) to reduce power consumption of the power amplifiers (e.g., by 50%). Advantages of reducing power consumption includes reduced cost and reduced emissions associated with power production and use. In some examples, such as sub-Thz systems, the PAE may be especially low, leading to greater power savings in such examples.

The UE 115-a and network entity 105-a may include thresholds to support higher modulation decoding, such as a transmitter error vector magnitude component (EVM), when determining non-linearity factors of transmitting and receiving the transmission 230. In some examples, the UE 115-a may employ a non-linearity cancellation algorithm. In such examples, the EVM threshold may be unnecessary, as the UE 115-a may account for poorer levels of EVMs stemming from non-linearities. That is, if the UE 115-a accounts for and corrects for non-linearities, the EVM threshold for higher order modulation may be mitigated and unnecessary. Operating in a higher order modulation may further increase power savings, such as by earlier radio frequency shutdown (e.g., because the same amount of data can be transmitted in a shorter duration). Thus, techniques described herein may provide for increased power savings benefits for higher order modulation schemes.

The UE 115-*a* may transmit the capability indication 215. The capability indication 215 may include whether the UE 115-*a* has the capability to operate in a first or a second mode for receiving the one or more reference signals 220 (e.g., CSI reference signals (RS)). In some examples, the first mode may be referred to as a "non-green mode" and the second mode may be referred to as a "green mode." The second mode (e.g., green mode) may engage more complexity in the channel state feedback calculation process for the UE 115-*a*, as described in further detail herein.

In some examples, the UE 115-*a* may indicate, as part of the capability indication 215, the capability to operate in the first mode (e.g., non-green mode). In the first mode, the network entity 105-*a* may transmit the reference signals 220 (e.g., CSI-RS) with a high (e.g., a default or a "non-reduced" such as 15*v*) supply voltage to the power amplifiers, resulting in little to no in-band non-linearity being present in the downlink signaling. The UE 115-*a* may estimate a link quality metric (e.g., the link SNR) from the reference signals 220 without cancelling non-linearities from the received reference signals 220 (e.g., because the network entity 105-*a* largely removed them from the signaling). The UE 115-*a* may use the link quality metric, among other parameters, to determine the parameter (e.g., MaxNonLinearity) of non-linearity cancellation capability from the look-up table, and report the parameter to the network entity 105-*a* as part of the report 225. The first mode may result in power consumption at the network entity 105-*a*, as the network entity 105-*a* may transmit the reference signals 220 with a higher supply voltage.

In some examples, the UE 115-*a* may indicate, as part of the capability indication 215, the capability to operate in the second mode (e.g., a green mode). In the second mode, the network entity 105-*a* may transmit the reference signals 220 in a green network mode, lowering supply voltage to the power amplifiers (e.g., lower with respect to a default or otherwise "non-reduced" power level, such as 11.6 v), resulting in reduced power consumption for transmitting the reference signals 220. Lowering the supply voltage to the power amplifier may increase non-linearities of the reference signals 220, while increasing power savings at the network entity 105-*a*. The UE 115-*a* may cancel non-linearities from the reference signals 220 and determine the link quality metric (e.g., the link SNR). After cancelling the non-linearities, the UE 115-*a* may proceed with determining the capability parameter. In some examples, the reference signals 220 may include or otherwise indicate a downlink resource allocation.

The additional parameter in the report 225 may indicate the capability of the UE 115-*a* to cancel non-linearities of downlink signals (e.g., the transmission 230). The report 225 may be a CSF report, or may be a separate report 225 indicating the non-linearity cancellation capability of the UE 115-*a*. The cancellation parameter (e.g., MaxNonLinearity) included in the report 225 may be a UE-dependent capability soft metric of how much non-linearity the UE 115-*a* can cancel while maintaining link SNR (e.g. allowing a small loss of TH<0.5 dB).

The UE 115-*a* may transmit the report 225 based on the reference signal 220 link quality metric and one or more characteristics of the downlink resource allocation, algorithm capability, additional parameters, or a combination thereof. In some examples, the one or more characteristics of the downlink resource allocation may include a modulation associated with the downlink resource allocation, an allocation bandwidth of the downlink resource allocation, or a combination thereof. In some examples, the report 225 may be a CSF report indicated by the UE 115-*a* to the network entity 105-*a*. The CSF report may include, in addition to the non-linearity cancelation parameter, a channel quality indicator (CQI), precoding matric indicator (PMI), rank indicator (RI), or a combination thereof.

The UE 115-*a* may have a look-up table storing the maximum sustainable cancellation parameter (e.g., MaxNonLinearity) for each table parameter, such as modulation, allocation bandwidth, and link SNR, among other parameters the UE 115-*a* may include. The UE 115-*a* may retrieve the level of the cancellation parameter to be sent in the report 225 (e.g., extended CSF report). The network entity 105-*a* may receive the report 225 and translate the value of the cancellation parameter to appropriate reduced supply voltage to the power amplifiers (or other circuitry) of the network entity 105-*a*. In some examples, the network entity 105-*a* may reduce the power consumption of the power amplifiers by increasing the in-band non-linearity level to the reported level of the cancellation parameter and decreasing the level of non-linearity cancellation performed by the network entity 105-*a*. Such reduction of non-linearity cancelation may result in significant power consumption savings at the network entity 105-*a* and utilize the maximum of the capability of the UE 115-*a* to cancel non-linearities as reported in the report 225.

In some examples, different UEs 115 may have different non-linearity cancellation capabilities. Non-linearity cancellation capabilities may be affected by the power of the engaged algorithm (e.g., digital post distortion (DPoD) or other variations). Thus, reporting an individual capability of the UE 115-*a* may exhaust the maximum possible network entity 105-*a* power amplifier supply voltage reduction so that the capability of the UE 115-*a* to cancel non-linearities is not exceeded.

The UE 115-*a* may employ a band non-linearity cancellation algorithm. The UE 115-*a* may at least partially base the parameter included in the report 225 on the cancellation algorithm. Different algorithms may have a different suppression capability depending on how powerful the algorithm is. For example, a band non-linearity cancellation algorithm may be strong, medium, or poor.

In some examples, cancellation algorithms may be described as strong, medium, or poor. For example, a strong algorithm may have DPoD for estimating and cancelling non-linearity. The DPoD may be based on tentative hard decision on the noisy symbols so as to reconstruct the non-linearity signal to be subtracted from the received signal, as well as feedback from the decoder of successfully decoded (e.g., CRC) hard bits. The hard bits may then be remapped to perfect symbols. Such examples may apply to OFDM symbols, where the DPoD correction algorithm indicates poor non-linearity cancellation (e.g., poor EVM over pilots), where increased engagement of the decoder for a specific OFDM symbol may result in improved non-linearity suppression.

A medium algorithm may have DPoD for estimating and cancelling non-linearity which is based on tentative hard decisions on the noisy symbols so as to reconstruct the non-linearity signal to be subtracted from the received signal. A poor algorithm may include other non-linearity cancellation techniques operating on the inverse power amplifier model, rather on the direct power amplifier model. The poor algorithm may be simpler than a medium or strong algorithm, but may have poor cancellation capability due to noise enhancement.

Thus, for the same received signal conditions, different UEs 115 may report different cancellation parameter (e.g., MaxNonLinearity) levels, as each UE 115 may have different non-linearity cancellation capabilities. If the UE 115-*a* does not have such non-linearity capabilities, the report 225 may include a parameter indicating MaxNonLinearity="−infinity".

The network entity 105-*a* may receive the report 225, and translate the parameter into a value of voltage or some other power measurement. The network entity 105-*a* may adjust (e.g., reduce) the supply voltage of the power amplifiers accordingly. In some examples, the network entity 105-*a* may translate the report 225 based on offline calibrated tables (e.g., converting voltage to non-linearity), as associated with the specific UE 115-*a*.

Following the adjustment of the supply voltage of the power amplifiers, the network entity 105-*a* may transmit the transmission 230 (e.g., a PDSCH) accordingly. The transmission 230 may be transmitted according to the report 225 and the downlink resource allocation included in the reference signals 220, which may be with reduced supply voltage and reduced power consumption. The UE 115-*a* may receive the transmission 230 and cancel the non-linearities according to the capability reported.

Figure 3:
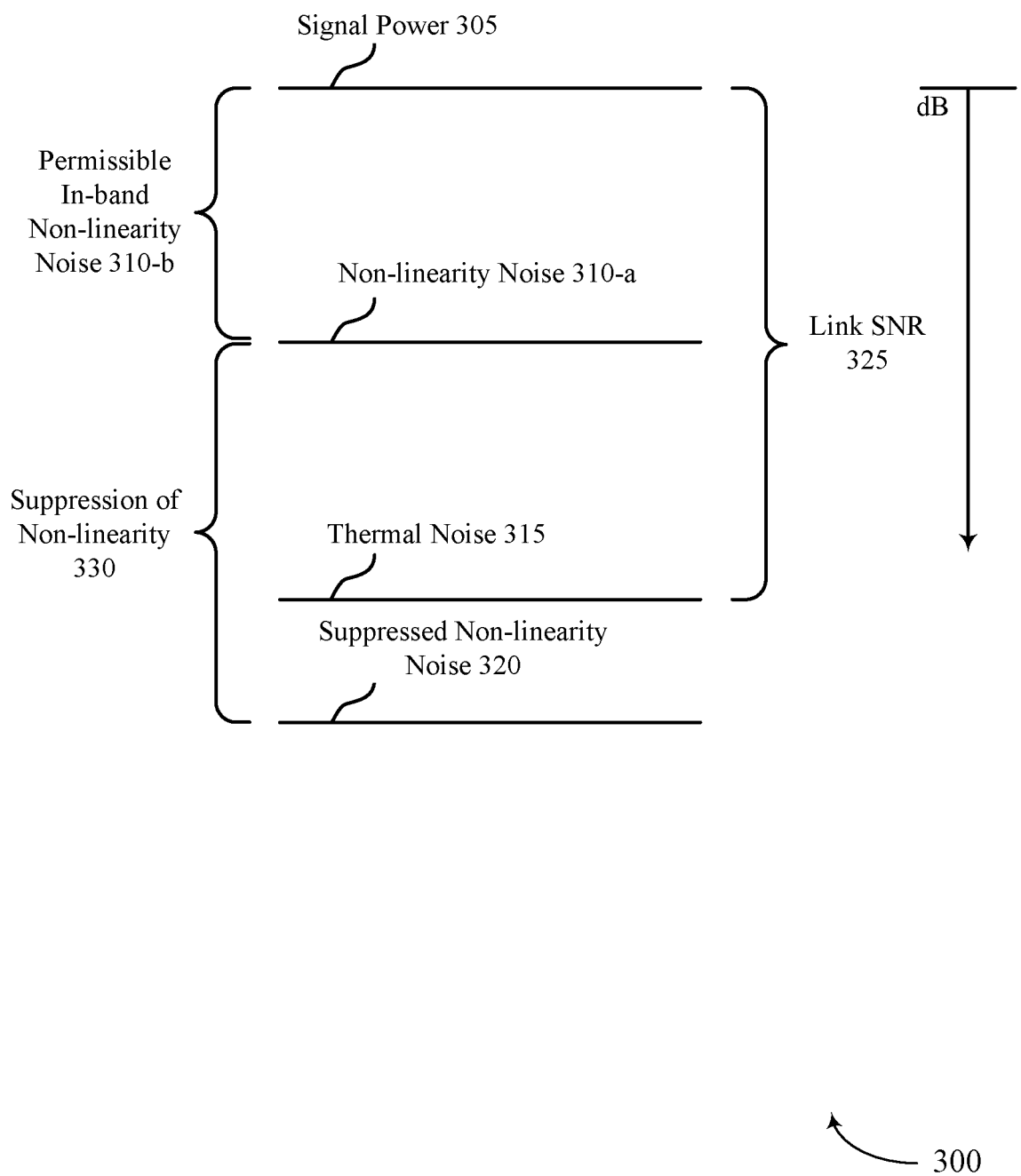
FIG. 3 shows an example of a signal power diagram that supports report messaging for indicating non-linearity cancelation capability in accordance with one or more aspects of the present disclosure.

FIG. 3 shows an example of a signal power diagram 300 that supports report messaging for indicating non-linearity cancelation capability in accordance with one or more aspects of the present disclosure. Signal power diagram 300 illustrates the non-linearity cancelation capability of the UE (e.g., the UE 115) and the non-linearity noise of the signal. FIG. 3 may include implementation of aspects described with reference to FIGS. 1 and 2.

A base signal power 305, which may be measured in dB (e.g., dBc), indicates a base signal power (e.g., 0 dBc) of a signal (e.g., a downlink signal). A non-linearity noise 310-*a* may represent an amount of noise due to non-linearities of a signal, and a permissible in-band non-linearity noise 310-*b* may represent an amount of in-band non-linearity noise that is permissible based on a non-linearity reduction capability of the UE. A thermal noise 315 may represent an amount of noise due to thermal noise or other similar artifacts. A suppressed non-linearity noise 320 represents the level to which the non-linearity can be suppressed (e.g., by a UE 115 applying one or more algorithms). A suppression of non-linearity 330 describes the differences between the non-linearity noise 310-*a* and the level of suppressed non-linearity noise 320. The suppressed non-linearity noise 320 may be a result of the UE suppressing the non-linearity noise 310-*a*.

For a particular signal power 305 (e.g., 0 dBc), link SNR 325 (e.g., 30 dB), and non-linearity noise 310-*a*, the UE may have a permissible in-band non-linearity noise 310-*b* determined by the non-linearity noise cancellation capabilities of the UE. For example, the permissible in-band non-linearity noise 310-*b* may be an example of the cancellation parameter (e.g., MaxNonLinearity) as described herein. The permissible in-band non-linearity noise 310-*b* (e.g., cancellation parameter) may be based on the link SNR 325 of the reference signals, the one or more characteristic of the downlink resource allocation, the algorithm of the UE, the capability of the UE to operate in the first mode or the second mode (e.g., non-green mode and green mode), other parameters of the reference signals, or a combination thereof. The permissible in-band non-linearity noise 310-*b* (e.g., cancellation parameter) may be indicated to the network entity (e.g., the network entity 105) as part of a report, such as included in the CSF report, or a separate report. The network entity may implement the permissible in-band non-linearity noise 310-*b* for power reduction as described herein.

Figure 4:
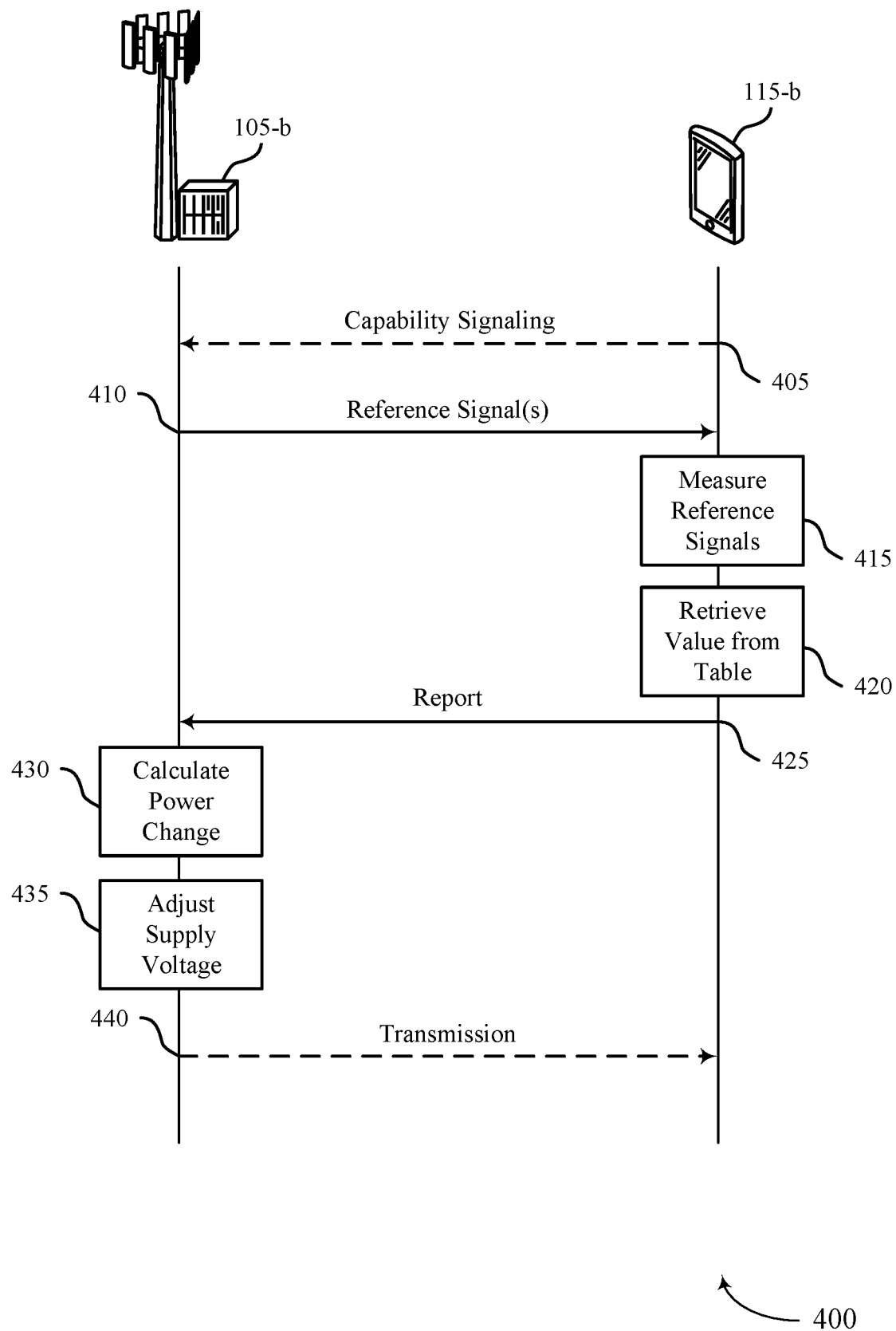
FIG. 4 shows an example of a process flow that supports report messaging for indicating non-linearity cancelation capability in accordance with one or more aspects of the present disclosure.

FIG. 4 shows an example of a process flow 400 that supports report messaging for indicating non-linearity cancelation capability in accordance with one or more aspects of the present disclosure. The process flow 400 illustrates the communications supporting a report of non-linearity cancellation capability of a UE 115-*b*. The UE 115-*b* may be an example of the UE 115 as described with reference to FIG. 1, and a network entity 105-*b* may be an example of the network entity 105-*a* as described with reference to FIG. 1. The example in FIG. 4 may include implementation of aspects described with reference to FIGS. 1, 2, and 3. Alternative examples of the following process flow may be implemented, where some steps are performed in a different order than described or are not performed at all. In some cases, steps may include additional features not mentioned below, or further steps may be added.

At 405, the UE 115-*b* may transmit, and the network entity 105-*b* may receive, capability signaling including an indication of a capability of the UE 115-*b* to receive the one or more reference signals according to a first mode or a second mode. The first mode may be associated with the network entity 105-*b* transmitting reference signals with a first power level, and the second mode may be associated with the network entity 105-*b* transmitting reference signals with a second power level that is less than the first power level. For example, the first and second mode may be examples of a "non-green mode" and "green mode" as described herein.

At 410, the UE 115-*b* may receive, and the network entity 105-*b* may transmit, one or more reference signals. The reference signals may be received by the UE 115-*b* according to the first mode or the second mode. In some examples, the UE 115-*b* may receive the reference signals according to the first mode, which may include calculating the link quality metric without performing a non-linearity cancellation process on the reference signals. In some other examples, the UE 115-*b* may receive the reference signals according to the first mode, which may include calculating the link quality metric after performing a non-linearity cancellation process on the reference signals.

At 415, the UE 115-*b* may measure a link quality metric for one or more reference signals associated with a downlink resource allocation. The link quality metric may include a link SNR.

At 420, the UE 115-*b* may retrieve a value of the parameter from a table including multiple values of the link quality metric and multiple values of the one or more characteristics of the downlink resource allocation. For example, the link quality metric may be the link SNR of the one or more reference signals measured by the UE 115-*b*. The one or more characteristics of the downlink resource allocation may include a modulation associated with the downlink resource allocation, an allocation bandwidth of the downlink resource allocation, or a combination thereof. The parameter retrieved by the UE 115-*b* may be an example of the cancellation parameter (e.g., MaxNonLinearity) as described herein.

At 425, the UE 115-*b* may transmit a report message that includes at least a parameter indicating a non-linearity threshold associated with a capability of the UE 115-*b* to process non-linearity of downlink signals, where the parameter may be based on the link quality metric and one or more characteristics of the downlink resource allocation.

In some examples, the report message may include a CSF report, where the CSF report includes a channel quality indicator, a precoding matrix indicator, a rank indicator, or a combination thereof. For example, the CSF report may include the parameter (e.g., the cancellation parameter). In some examples, the parameter may be included as part of a separate report.

In some examples, the non-linearity threshold may be associated with the capability of the UE to process a maximum amount of non-linearity of downlink signals while maintaining a threshold SNR loss. The capability of the UE 115-*b* to process non-linearity of downlink signals may be based on a capability of an in-band non-linearity cancellation algorithm of the UE 115-*b*. The cancellation algorithm may be of varying strength and capability, as further described in FIG. 2.

At 430, the network entity 105-*b* may calculate a power change. The network entity 105-*b* may translate the value of the parameter included in the report to a value of supply voltage.

At 435, the network entity 105-*b* may adjust a power level of one or more power amplifiers based on the parameter. For example, the network entity 105-*b* may adjust the power level of the power amplifiers by reducing supply voltage. In some examples, the network entity 105-*b* may adjust the power level of one or more other circuitry components.

At 440, the UE 115-*b* may receive one or more downlink messages in accordance with the downlink resource allocation and based on the parameter. For example, the UE 115-*b* may cancel non-linearities of the signal according to the capability indicated (e.g., the parameter) by the UE 115-*b*.

Figure 5:
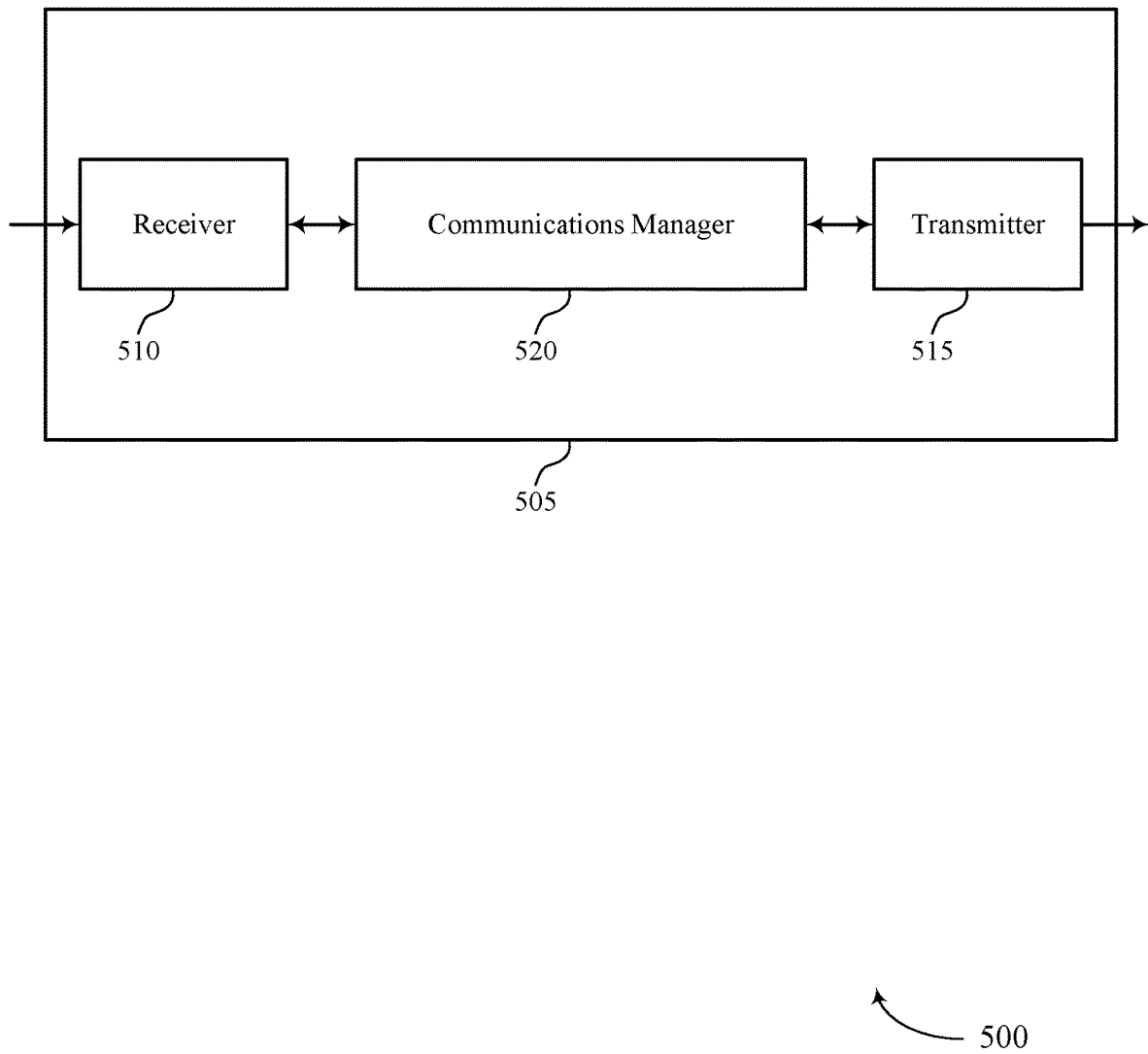
FIGS. 5 and 6 show block diagrams of devices that support report messaging for indicating non-linearity cancelation capability in accordance with one or more aspects of the present disclosure.

FIG. 5 shows a block diagram 500 of a device 505 that supports report messaging for indicating non-linearity cancelation capability in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to report message for indicating non-linearity cancelation capability). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to report message for indicating non-linearity cancelation capability). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of report message for indicating non-linearity cancelation capability as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for measuring a link quality metric for one or more reference signals associated with a downlink resource allocation. The communications manager 520 is capable of, configured to, or operable to support a means for transmitting a report message that includes at least a parameter indicating a non-linearity threshold associated with a capability of the UE to process non-linearity of downlink signals, where the parameter is based on the link quality metric and one or more characteristics of the downlink resource allocation. The communications manager 520 is capable of, configured to, or operable to support a means for receiving one or more downlink messages in accordance with the downlink resource allocation and based on the parameter.

By including or configuring the communications manager 520 in accordance with examples as described herein, the device 505 (e.g., a processor controlling or otherwise coupled with the receiver 510, the transmitter 515, the communications manager 520, or a combination thereof)

may support techniques for a report message for indicating non-linearity cancelation capability, which may result in reduced processing, reduced power consumption, more efficient utilization of communication resources, reduced power consumption at the network entity, reduced power consumption of the power amplifiers of the network entity, among other advantages.

Figure 6:
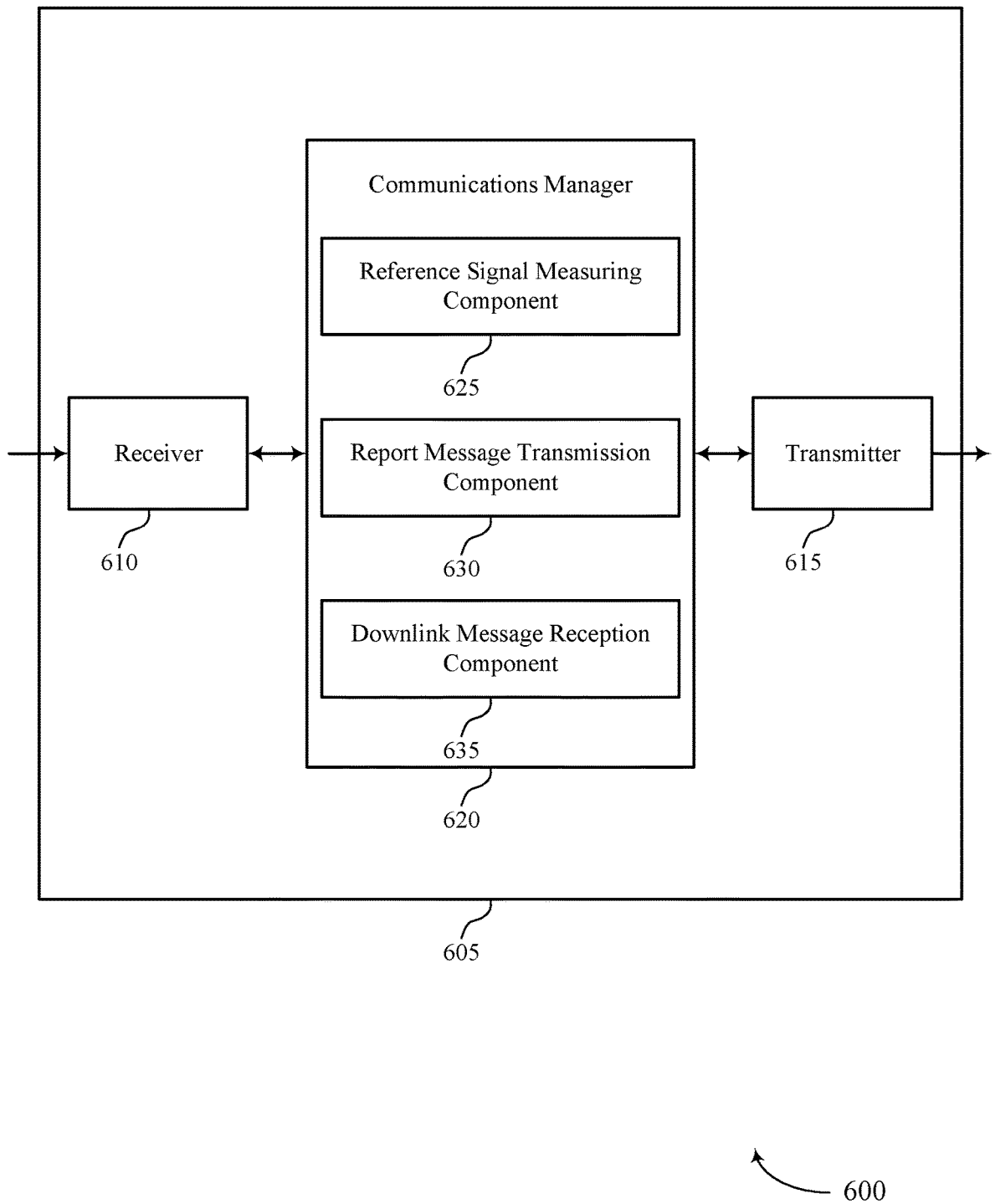

FIG. 6 shows a block diagram 600 of a device 605 that supports report messaging for indicating non-linearity cancelation capability in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to report message for indicating non-linearity cancelation capability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to report message for indicating non-linearity cancelation capability). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of report message for indicating non-linearity cancelation capability as described herein. For example, the communications manager 620 may include a reference signal measuring component 625, a report message transmission component 630, a downlink message reception component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The reference signal measuring component 625 is capable of, configured to, or operable to support a means for measuring a link quality metric for one or more reference signals associated with a downlink resource allocation. The report message transmission component 630 is capable of, configured to, or operable to support a means for transmitting a report message that includes at least a parameter indicating a non-linearity threshold associated with a capability of the UE to process non-linearity of downlink signals, where the parameter is based on the link quality metric and one or more characteristics of the downlink resource allocation. The downlink message reception component 635 is capable of, configured to, or operable to support a means for receiving one or more downlink messages in accordance with the downlink resource allocation and based on the parameter.

Figure 7:
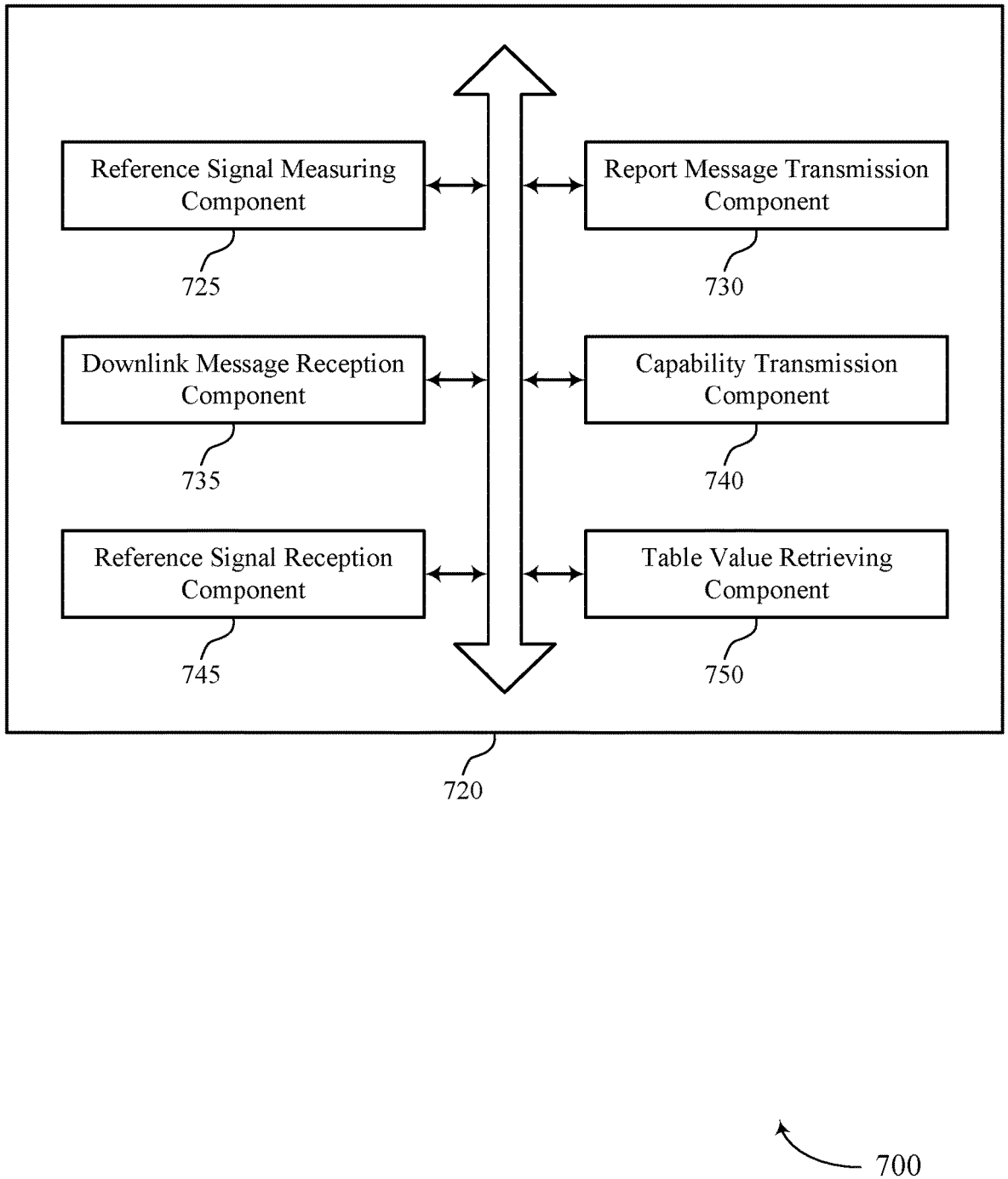
FIG. 7 shows a block diagram of a communications manager that supports report messaging for indicating non-linearity cancelation capability in accordance with one or more aspects of the present disclosure.

FIG. 7 shows a block diagram 700 of a communications manager 720 that supports report messaging for indicating non-linearity cancellation capability in accordance with one or more aspects of the present disclosure. The communications manager 720 may be an example of aspects of a communications manager 520, a communications manager 620, or both, as described herein. The communications manager 720, or various components thereof, may be an example of means for performing various aspects of report message for indicating non-linearity cancellation capability as described herein. For example, the communications manager 720 may include a reference signal measuring component 725, a report message transmission component 730, a downlink message reception component 735, a capability transmission component 740, a reference signal reception component 745, a table value retrieving component 750, or any combination thereof. Each of these components may communicate, directly or indirectly, with one another (e.g., via one or more buses).

The communications manager 720 may support wireless communications at a UE in accordance with examples as disclosed herein. The reference signal measuring component 725 is capable of, configured to, or operable to support a means for measuring a link quality metric for one or more reference signals associated with a downlink resource allocation. The report message transmission component 730 is capable of, configured to, or operable to support a means for transmitting a report message that includes at least a parameter indicating a non-linearity threshold associated with a capability of the UE to process non-linearity of downlink signals, where the parameter is based on the link quality metric and one or more characteristics of the downlink resource allocation. The downlink message reception component 735 is capable of, configured to, or operable to support a means for receiving one or more downlink messages in accordance with the downlink resource allocation and based on the parameter.

In some examples, the capability transmission component 740 is capable of, configured to, or operable to support a means for transmitting an indication of a capability of the UE to receive the one or more reference signals according to a first mode or a second mode, where the first mode is associated with a network entity transmitting reference signals with a first power level, and where the second mode is associated with the network entity transmitting reference signals with a second power level that is less than the first power level. In some examples, the reference signal reception component 745 is capable of, configured to, or operable to support a means for receiving the reference signals according to the first mode or the second mode.

In some examples, receiving the reference signals according to the first mode includes calculating the link quality metric without performing a non-linearity cancellation process on the reference signals.

In some examples, receiving the reference signals according to the second mode includes calculating the link quality metric after performing a non-linearity cancellation process on the reference signals.

In some examples, the table value retrieving component 750 is capable of, configured to, or operable to support a means for retrieving a value of the parameter from a table including a set of multiple values of the link quality metric and a set of multiple values of the one or more characteristics of the downlink resource allocation.

In some examples, the report message includes a channel state feedback (CSF) report. In some examples, the CSF report includes a channel quality indicator, a precoding matrix indicator, a rank indicator, or a combination thereof.

In some examples, the non-linearity threshold is associated with the capability of the UE to process a maximum amount of non-linearity of downlink signals while maintaining a threshold signal-to-noise ratio loss.

In some examples, the capability of the UE to process non-linearity of downlink signals is based on a capability of an in-band non-linearity cancellation algorithm of the UE.

In some examples, the one or more characteristics of the downlink resource allocation includes a modulation associated with the downlink resource allocation, an allocation bandwidth of the downlink resource allocation, or a combination thereof.

In some examples, the link quality metric includes a link signal-to-noise ratio.

Figure 8:
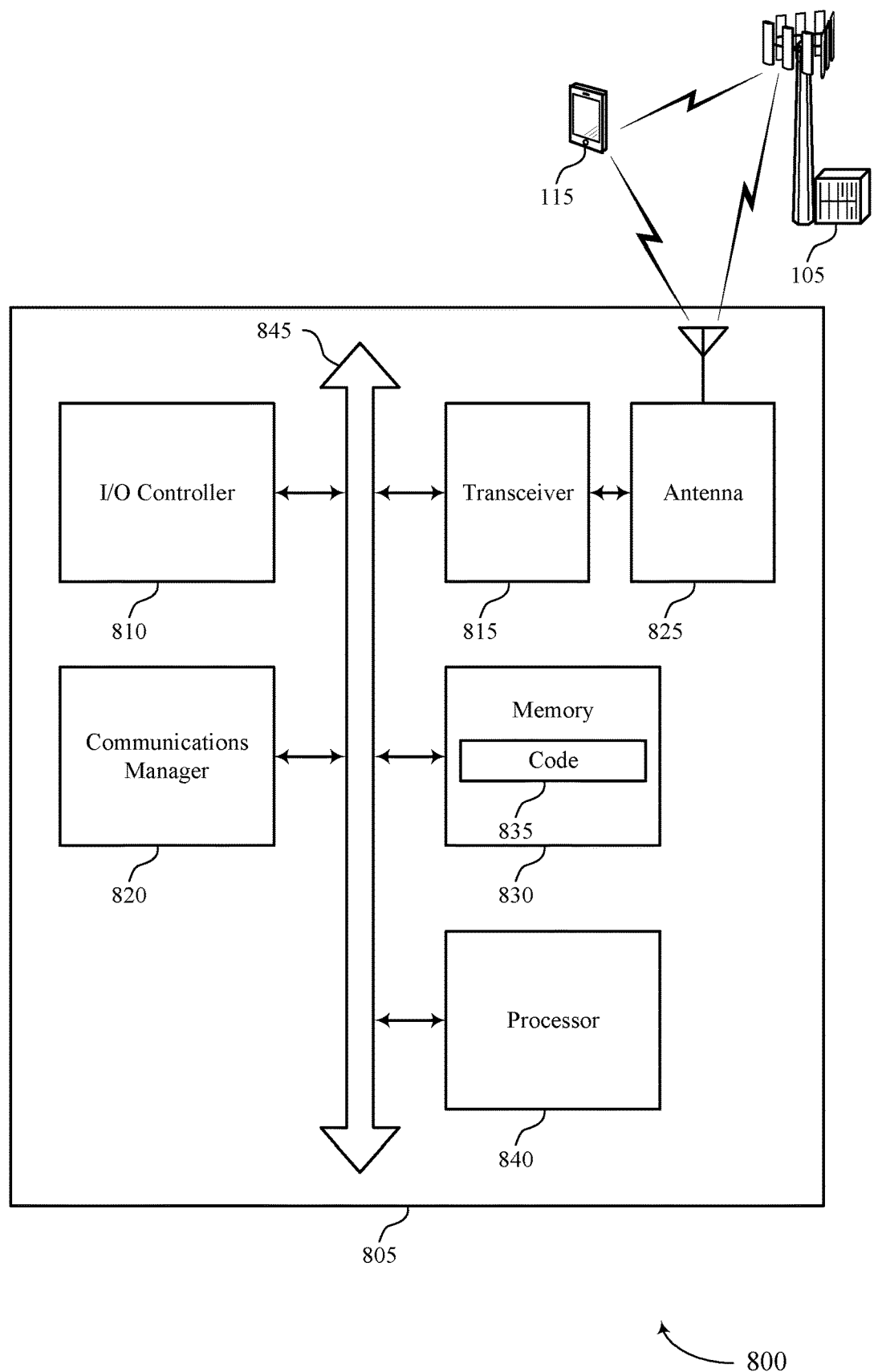
FIG. 8 shows a diagram of a system including a device that supports report messaging for indicating non-linearity cancelation capability in accordance with one or more aspects of the present disclosure.

FIG. 8 shows a diagram of a system 800 including a device 805 that supports report messaging for indicating non-linearity cancelation capability in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting report message for indicating non-linearity cancelation capability). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for measuring a link quality metric for one or more reference signals associated with a downlink resource allocation. The communications manager 820 is capable of, configured to, or operable to support a means for transmitting a report message that includes at least a parameter indicating a non-linearity threshold associated with a capability of the UE to process non-linearity of downlink signals, where the parameter is based on the link quality metric and one or more characteristics of the downlink resource allocation. The communications manager 820 is capable of, configured to, or operable to support a means for receiving one or more downlink messages in accordance with the downlink resource allocation and based on the parameter.

By including or configuring the communications manager 820 in accordance with examples as described herein, the device 805 may support techniques for a report message for indicating non-linearity cancellation capability, which may result in improved communication reliability, reduced latency, improved user experience related to reduced processing, reduced power consumption, more efficient utilization of communication resources, improved coordination between devices, longer battery life, improved utilization of processing capability, reduced power consumption of the power amplifiers of the network entity, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of report message for indicating non-linearity cancelation capability as described herein, or the processor 840 and the memory 830 may be otherwise configured to perform or support such operations.

Figure 9:
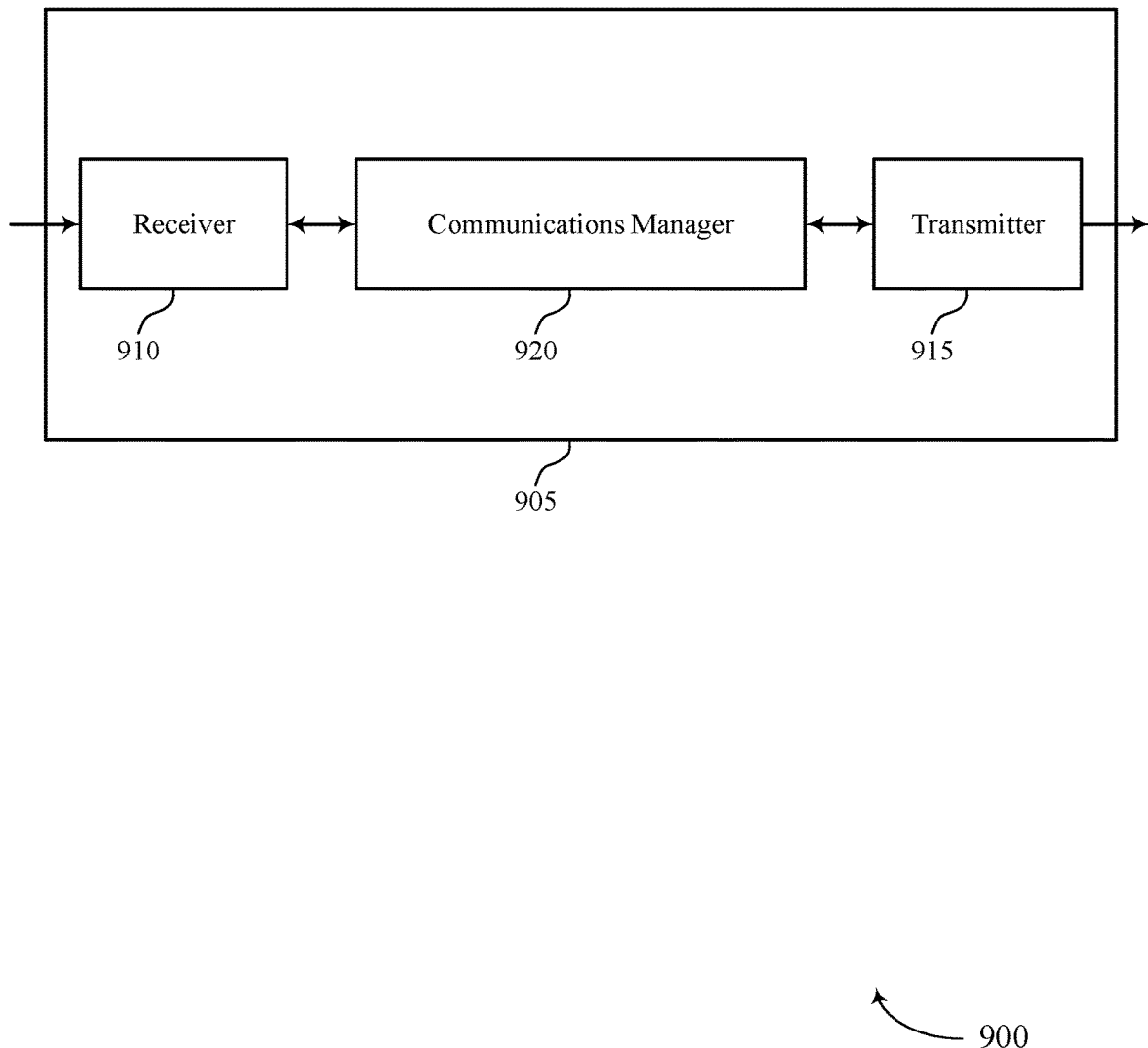
FIGS. 9 and 10 show block diagrams of devices that support report messaging for indicating non-linearity cancelation capability in accordance with one or more aspects of the present disclosure.

FIG. 9 shows a block diagram 900 of a device 905 that supports report messaging for indicating non-linearity cancelation capability in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of report message for indicating non-linearity cancelation capability as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting one or more reference signals associated with a downlink resource allocation. The communications manager 920 is capable of, configured to, or operable to support a means for receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE. The communications manager 920 is capable of, configured to, or operable to support a means for transmitting one or more downlink messages in accordance with the downlink resource allocation and based on the parameter.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for a report message for indicating non-linearity cancelation capability, which may result in reduced processing, reduced power consumption, more efficient utilization of communication resources, reduced power consumption at the network entity, reduced power consumption of the power amplifiers of the network entity, among other advantages.

Figure 10:
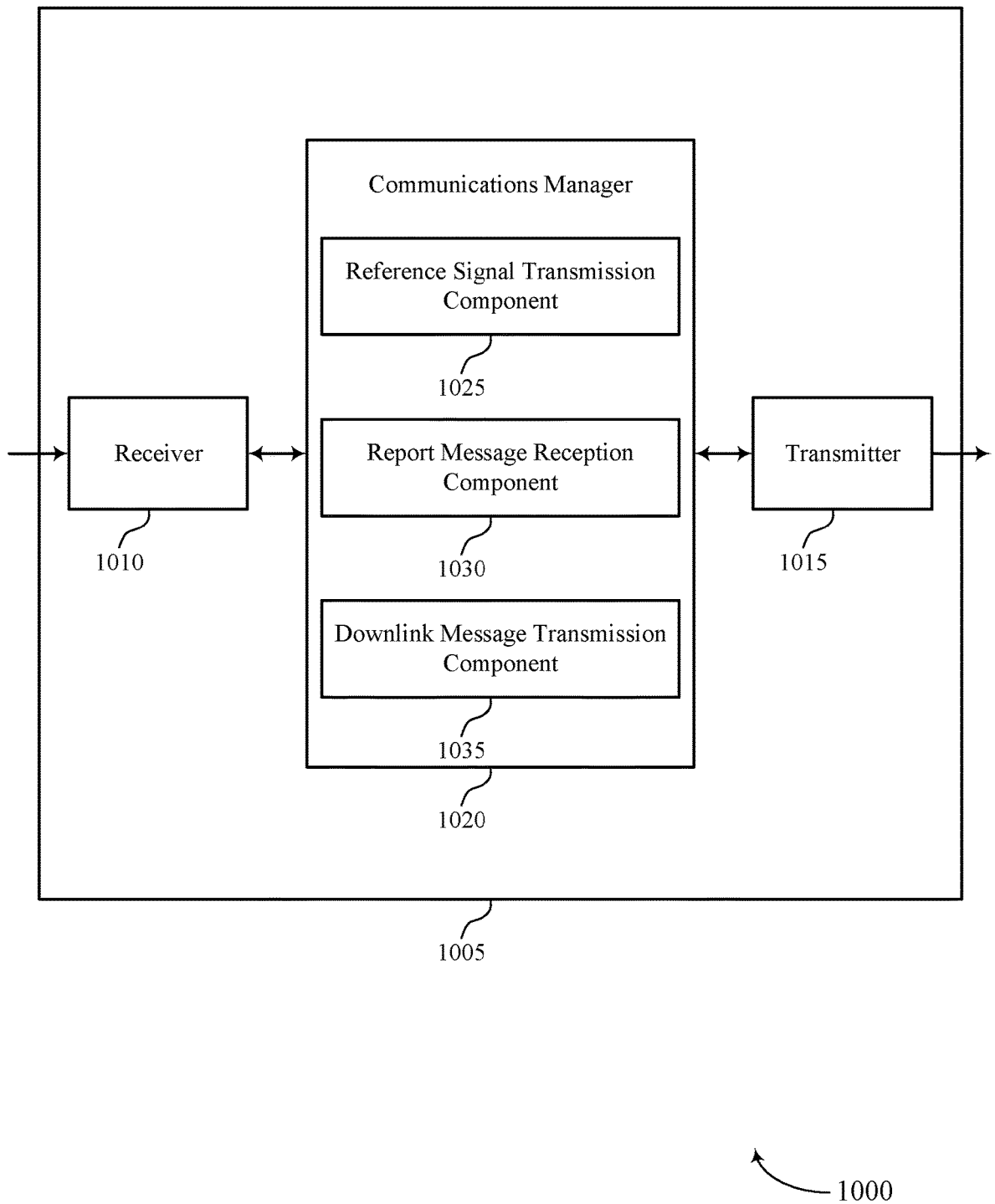

FIG. 10 shows a block diagram 1000 of a device 1005 that supports report messaging for indicating non-linearity cancelation capability in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of report message for indicating non-linearity cancelation capability as described herein. For example, the communications manager 1020 may include a reference signal transmission component 1025, a report message reception component 1030, a downlink message transmission component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The reference signal transmission component 1025 is capable of, configured to, or operable to support a means for transmitting one or more reference signals associated with a downlink resource allocation. The report message reception component 1030 is capable of, configured to, or operable to support a means for receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE. The downlink message transmission component 1035 is capable of, configured to, or operable to support a means for transmitting one or more downlink messages in accordance with the downlink resource allocation and based on the parameter.

Figure 11:
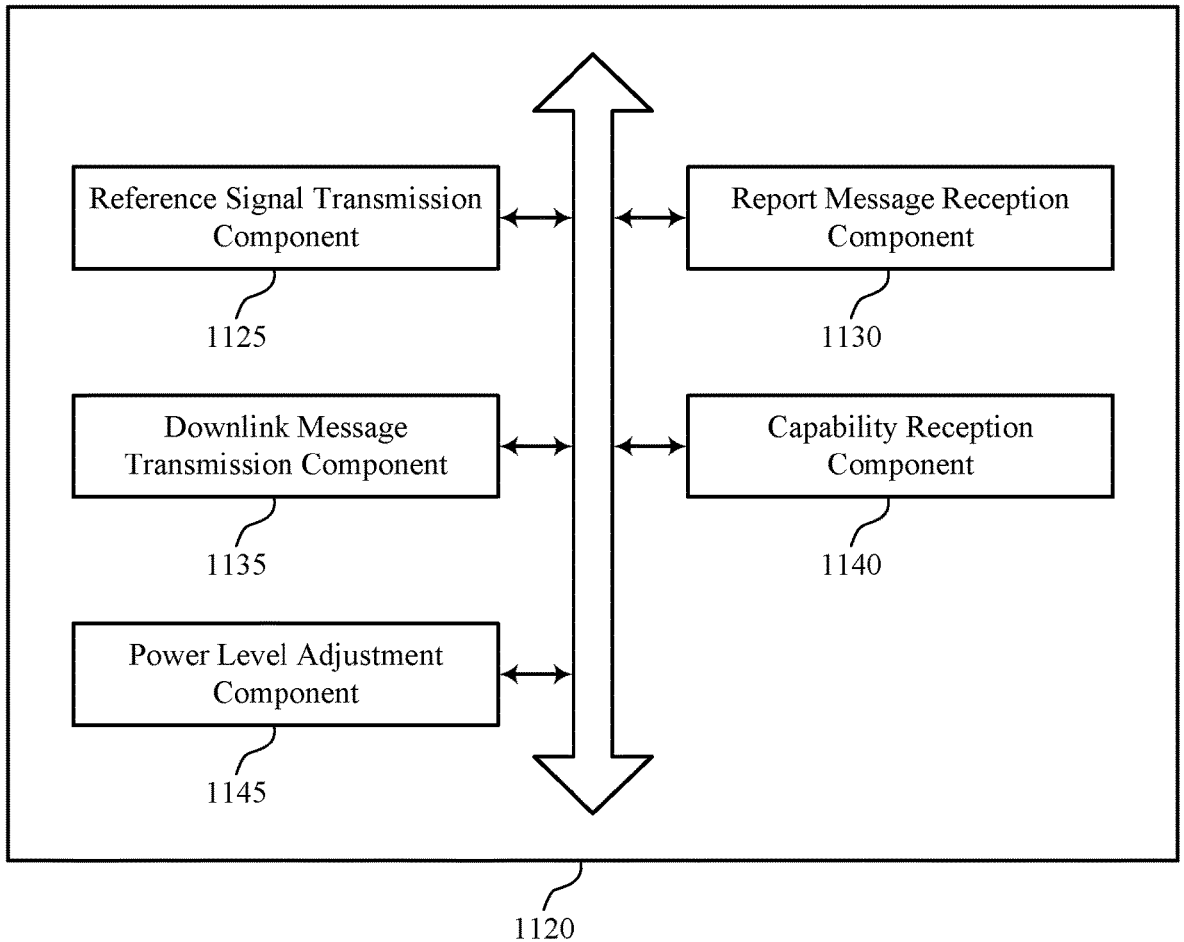
FIG. 11 shows a block diagram of a communications manager that supports report messaging for indicating non-linearity cancelation capability in accordance with one or more aspects of the present disclosure.

FIG. 11 shows a block diagram 1100 of a communications manager 1120 that supports report messaging for indicating non-linearity cancelation capability in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of report message for indicating non-linearity cancelation capability as described herein. For example, the communications manager 1120 may include a reference signal transmission component 1125, a report message reception component 1130, a downlink message transmission component 1135, a capability reception component 1140, a power level adjustment component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The reference signal transmission component 1125 is capable of, configured to, or operable to support a means for transmitting one or more reference signals associated with a downlink resource allocation. The report message reception component 1130 is capable of, configured to, or operable to support a means for receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE. The downlink message transmission component 1135 is capable of, configured to, or operable to support a means for transmitting one or more downlink messages in accordance with the downlink resource allocation and based on the parameter.

In some examples, the capability reception component 1140 is capable of, configured to, or operable to support a means for receiving an indication of a capability of the UE to receive the one or more reference signals according to a first mode or a second mode, where the first mode is associated with the network entity transmitting reference signals with a first power level, and where the second mode is associated with the network entity transmitting reference signals with a second power level that is less than the first power level. In some examples, the reference signal transmission component 1125 is capable of, configured to, or operable to support a means for transmitting the reference signals according to the first mode or the second mode.

In some examples, the report message includes a channel state feedback (CSF) report. In some examples, the CSF report includes a channel quality indicator, a precoding matrix indicator, a rank indicator, or a combination thereof.

In some examples, the non-linearity threshold is associated with the capability of the UE to process a maximum amount of non-linearity of downlink signals while maintaining a threshold signal to noise ratio loss.

In some examples, the capability of the UE to process non-linearity of downlink signals is based on a capability of an in-band non-linearity cancellation algorithm of the UE.

In some examples, the one or more characteristics of the downlink resource allocation includes a modulation associated with the downlink resource allocation, an allocation bandwidth of the downlink resource allocation, or a combination thereof.

In some examples, the link quality metric includes a link signal-to-noise ratio.

In some examples, the power level adjustment component 1145 is capable of, configured to, or operable to support a means for adjusting a power level of one or more power amplifiers at the network entity based on the parameter.

Figure 12:
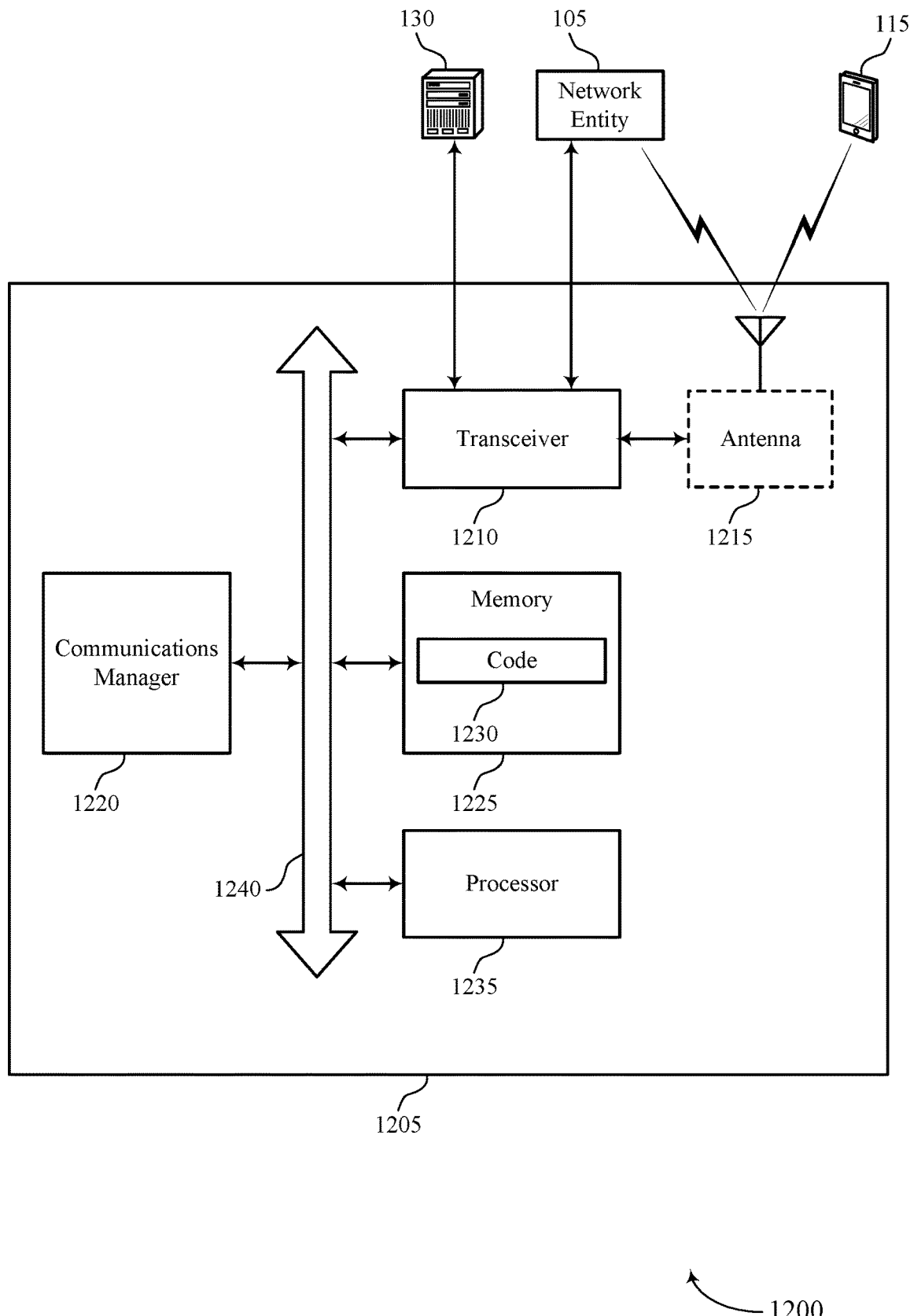
FIG. 12 shows a diagram of a system including a device that supports report messaging for indicating non-linearity cancelation capability in accordance with one or more aspects of the present disclosure.

FIG. 12 shows a diagram of a system 1200 including a device 1205 that supports report messaging for indicating non-linearity cancelation capability in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting report message for indicating non-linearity cancelation capability). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting one or more reference signals associated with a downlink resource allocation. The communications manager 1220 is capable of, configured to, or operable to support a means for receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE. The communications manager 1220 is capable of, configured to, or operable to support a means for transmitting one or more downlink messages in accordance with the downlink resource allocation and based on the parameter.

By including or configuring the communications manager 1220 in accordance with examples as described herein, the device 1205 may support techniques for a report message for indicating non-linearity cancelation capability, which may result in improved communication reliability, reduced latency, improved user experience related to reduced processing, reduced power consumption, more efficient utilization of communication resources, improved coordination between devices, longer battery life, improved utilization of processing capability, reduced power consumption at the network entity, reduced power consumption of the power amplifiers of the network entity, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of report message for indicating non-linearity cancelation capability as described herein, or the processor 1235 and the memory 1225 may be otherwise configured to perform or support such operations.

Figure 13:
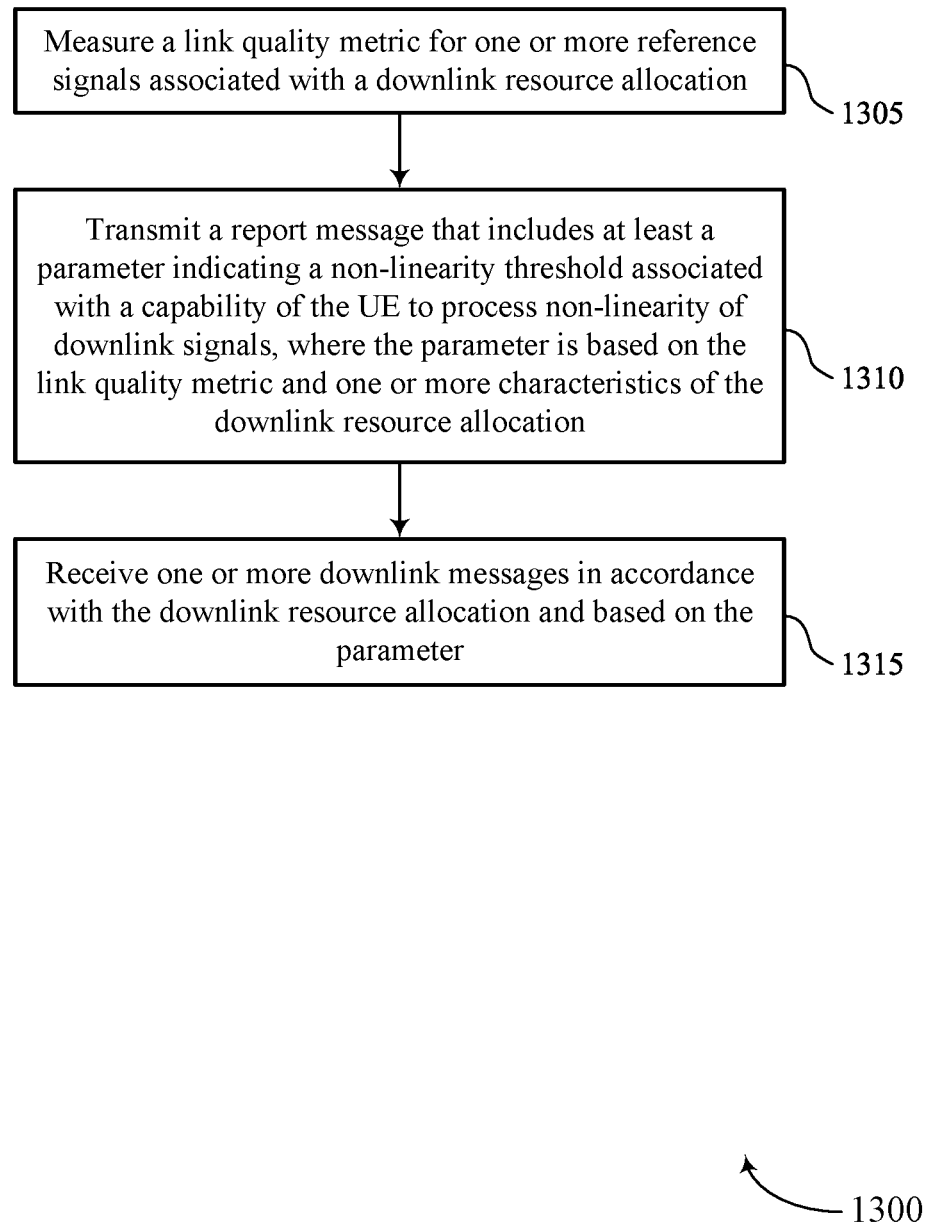
FIGS. 13 through 16 show flowcharts illustrating methods that support report messaging for indicating non-linearity cancelation capability in accordance with one or more aspects of the present disclosure.

FIG. 13 shows a flowchart illustrating a method 1300 that supports report messaging for indicating non-linearity cancelation capability in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1305, the method may include measuring a link quality metric for one or more reference signals associated with a downlink resource allocation. The operations of 1305 may be performed in accordance with examples as disclosed herein. In some examples, aspects of the operations of 1305 may be performed by a reference signal measuring component 725 as described with reference to FIG. 7.

At 1310, the method may include transmitting a report message that includes at least a parameter indicating a non-linearity threshold associated with a capability of the UE to process non-linearity of downlink signals, where the parameter is based on the link quality metric and one or more characteristics of the downlink resource allocation. The operations of 1310 may be performed in accordance with examples as disclosed herein. In some examples, aspects of the operations of 1310 may be performed by a report message transmission component 730 as described with reference to FIG. 7.

At 1315, the method may include receiving one or more downlink messages in accordance with the downlink resource allocation and based on the parameter. The operations of 1315 may be performed in accordance with examples as disclosed herein. In some examples, aspects of the operations of 1315 may be performed by a downlink message reception component 735 as described with reference to FIG. 7.

Figure 14:
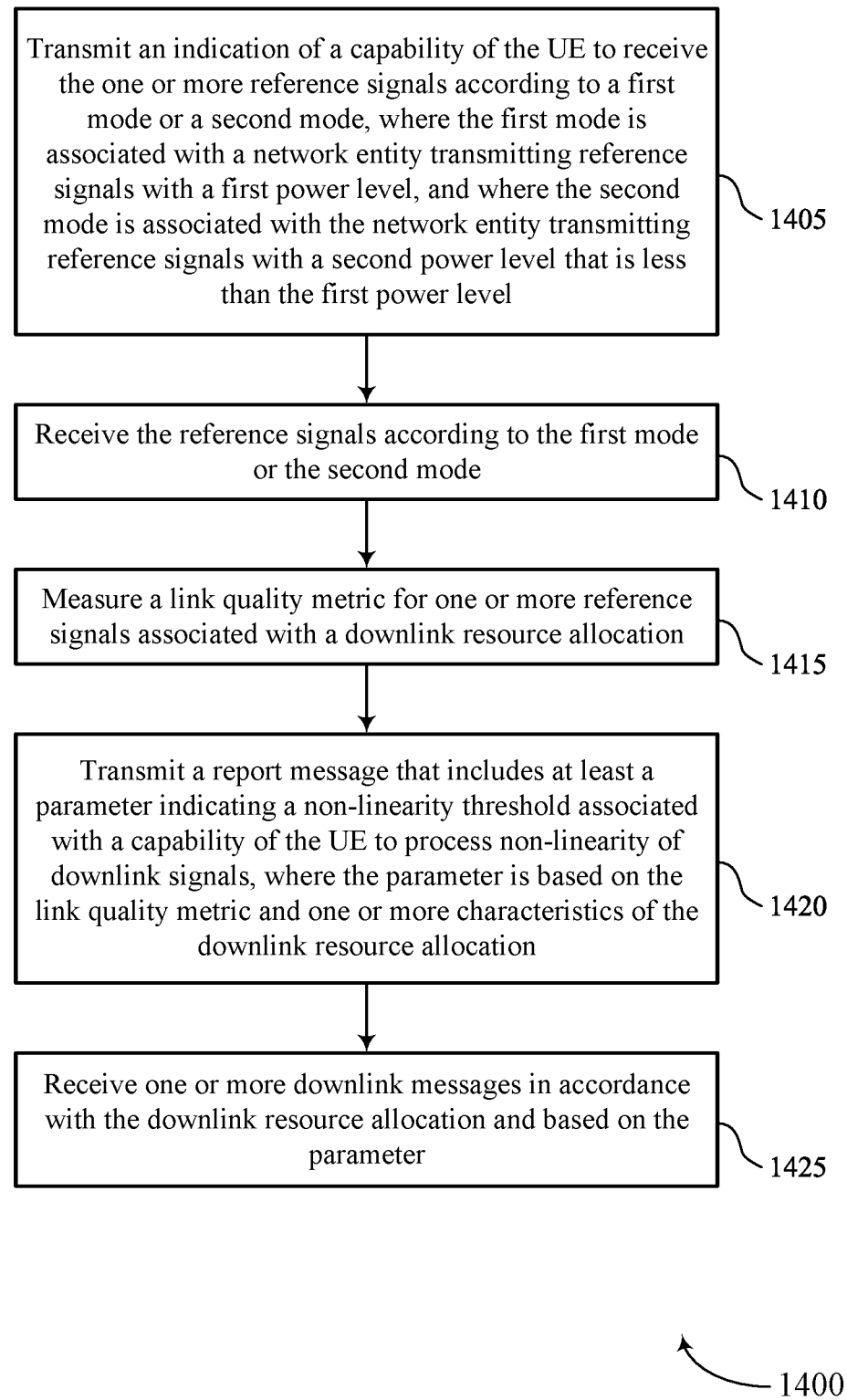

FIG. 14 shows a flowchart illustrating a method 1400 that supports report messaging for indicating non-linearity cancelation capability in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include transmitting an indication of a capability of the UE to receive the one or more reference signals according to a first mode or a second mode, where the first mode is associated with a network entity transmitting reference signals with a first power level, and where the second mode is associated with the network entity transmitting reference signals with a second power level that is less than the first power level. The operations of 1405 may be performed in accordance with examples as disclosed herein. In some examples, aspects of the operations of 1405 may be performed by a capability transmission component 740 as described with reference to FIG. 7.

At 1410, the method may include receiving the reference signals according to the first mode or the second mode. The operations of 1410 may be performed in accordance with examples as disclosed herein. In some examples, aspects of the operations of 1410 may be performed by a reference signal reception component 745 as described with reference to FIG. 7.

At 1415, the method may include measuring a link quality metric for one or more reference signals associated with a downlink resource allocation. The operations of 1415 may be performed in accordance with examples as disclosed herein. In some examples, aspects of the operations of 1415 may be performed by a reference signal measuring component 725 as described with reference to FIG. 7.

At 1420, the method may include transmitting a report message that includes at least a parameter indicating a non-linearity threshold associated with a capability of the UE to process non-linearity of downlink signals, where the parameter is based on the link quality metric and one or more characteristics of the downlink resource allocation. The operations of 1420 may be performed in accordance with examples as disclosed herein. In some examples, aspects of the operations of 1420 may be performed by a report message transmission component 730 as described with reference to FIG. 7.

At 1425, the method may include receiving one or more downlink messages in accordance with the downlink resource allocation and based on the parameter. The operations of 1425 may be performed in accordance with examples as disclosed herein. In some examples, aspects of the operations of 1425 may be performed by a downlink message reception component 735 as described with reference to FIG. 7.

Figure 15:
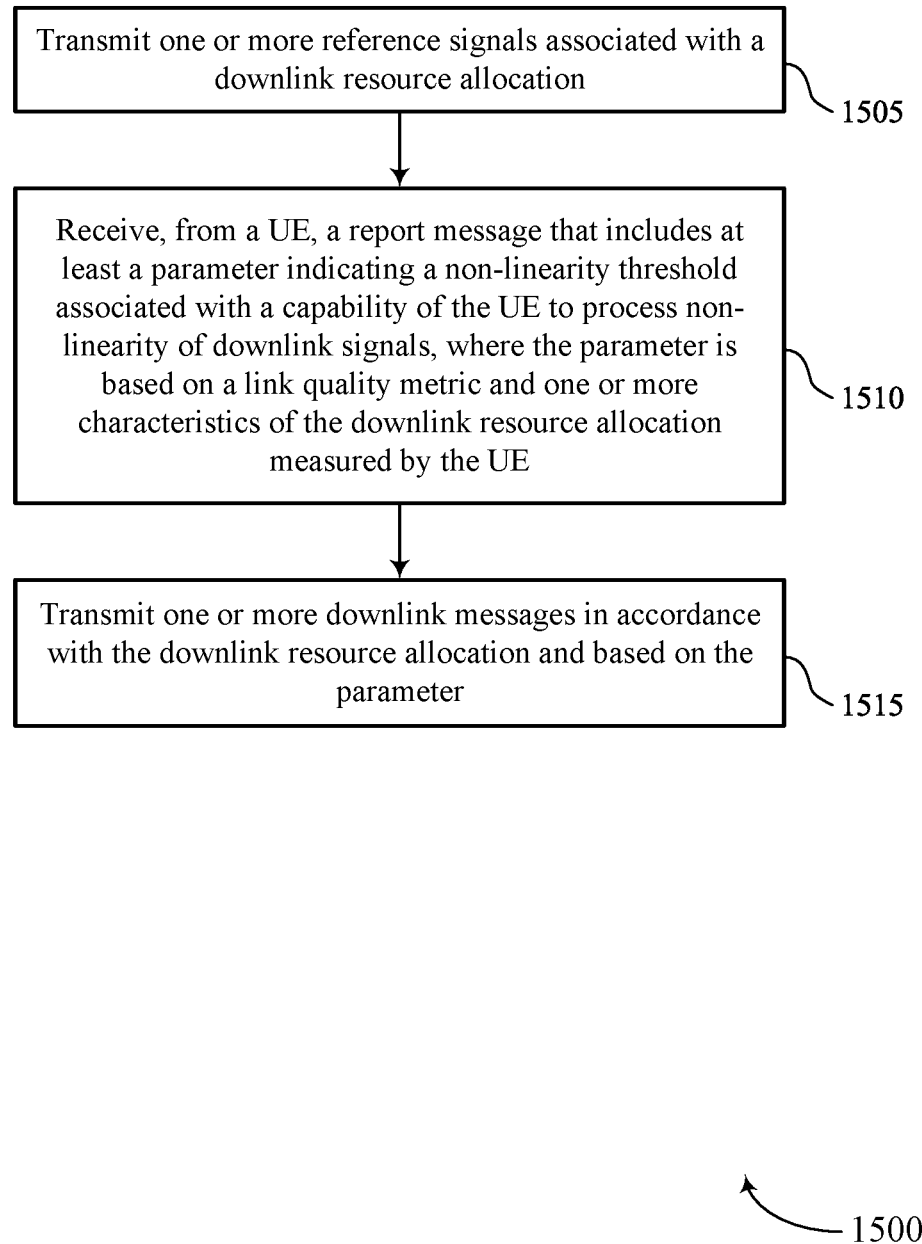

FIG. 15 shows a flowchart illustrating a method 1500 that supports report messaging for indicating non-linearity cancelation capability in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1505, the method may include transmitting one or more reference signals associated with a downlink resource allocation. The operations of 1505 may be performed in accordance with examples as disclosed herein. In some examples, aspects of the operations of 1505 may be performed by a reference signal transmission component 1125 as described with reference to FIG. 11.

At 1510, the method may include receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE. The operations of 1510 may be performed in accordance with examples as disclosed herein. In some examples, aspects of the operations of 1510 may be performed by a report message reception component 1130 as described with reference to FIG. 11.

At 1515, the method may include transmitting one or more downlink messages in accordance with the downlink resource allocation and based on the parameter. The operations of 1515 may be performed in accordance with examples as disclosed herein. In some examples, aspects of the operations of 1515 may be performed by a downlink message transmission component 1135 as described with reference to FIG. 11.

Figure 16:
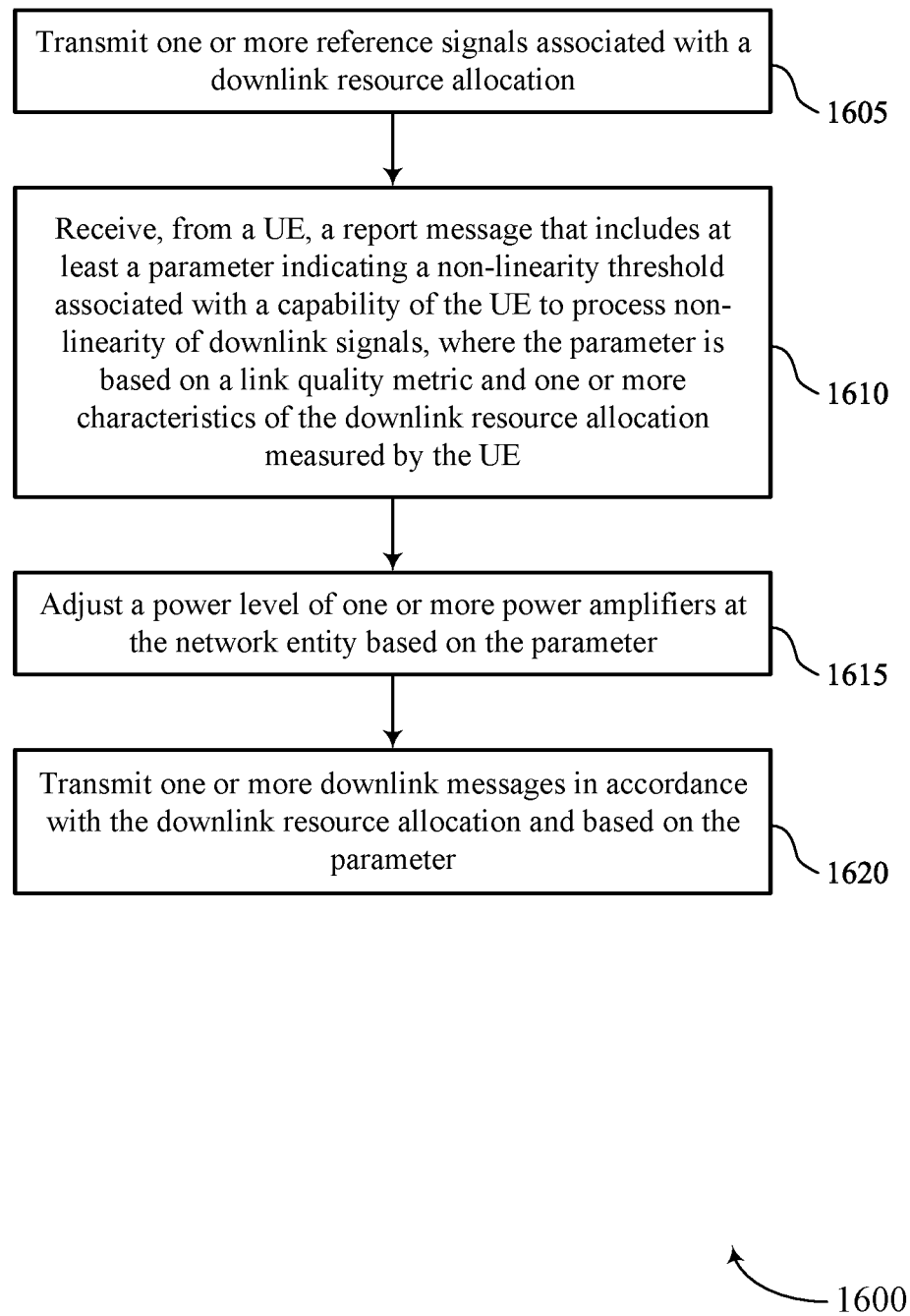

FIG. 16 shows a flowchart illustrating a method 1600 that supports report messaging for indicating non-linearity cancelation capability in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include transmitting one or more reference signals associated with a downlink resource allocation. The operations of 1605 may be performed in accordance with examples as disclosed herein. In some examples, aspects of the operations of 1605 may be performed by a reference signal transmission component 1125 as described with reference to FIG. 11.

At 1610, the method may include receiving, from a UE, a report message that includes at least a parameter indicating a non-linearity threshold associated with a capability of the UE to process non-linearity of downlink signals, where the parameter is based on a link quality metric and one or more characteristics of the downlink resource allocation measured by the UE. The operations of 1610 may be performed in accordance with examples as disclosed herein. In some examples, aspects of the operations of 1610 may be performed by a report message reception component 1130 as described with reference to FIG. 11.

At 1615, the method may include adjusting a power level of one or more power amplifiers at the network entity based on the parameter. The operations of 1615 may be performed in accordance with examples as disclosed herein. In some examples, aspects of the operations of 1615 may be performed by a power level adjustment component 1145 as described with reference to FIG. 11.

At 1620, the method may include transmitting one or more downlink messages in accordance with the downlink resource allocation and based on the parameter. The operations of 1620 may be performed in accordance with examples as disclosed herein. In some examples, aspects of the operations of 1620 may be performed by a downlink message transmission component 1135 as described with reference to FIG. 11.

The following provides an overview of aspects of the present disclosure:

Aspect 1: A method for wireless communications at a UE, comprising: measuring a link quality metric for one or more reference signals associated with a downlink resource allocation; transmitting a report message that comprises at least a parameter indicating a non-linearity threshold associated with a capability of the UE to process non-linearity of downlink signals, wherein the parameter is based at least in part on the link quality metric and one or more characteristics of the downlink resource allocation; and receiving one or more downlink messages in accordance with the downlink resource allocation and based at least in part on the parameter.

Aspect 2: The method of aspect 1, further comprising: transmitting an indication of a capability of the UE to receive the one or more reference signals according to a first mode or a second mode, wherein the first mode is associated with a network entity transmitting reference signals with a first power level, and wherein the second mode is associated with the network entity transmitting reference signals with a second power level that is less than the first power level; and receiving the reference signals according to the first mode or the second mode.

Aspect 3: The method of aspect 2, wherein receiving the reference signals according to the first mode comprises calculating the link quality metric without performing a non-linearity cancellation process on the reference signals.

Aspect 4: The method of any of aspects 2 through 3, wherein receiving the reference signals according to the second mode comprises calculating the link quality metric after performing a non-linearity cancellation process on the reference signals.

Aspect 5: The method of any of aspects 1 through 4, further comprising: retrieving a value of the parameter from a table comprising a plurality of values of the link quality metric and a plurality of values of the one or more characteristics of the downlink resource allocation.

Aspect 6: The method of any of aspects 1 through 5, wherein the report message comprises a channel state feedback (CSF) report, and the CSF report comprises a channel quality indicator, a precoding matrix indicator, a rank indicator, or a combination thereof.

Aspect 7: The method of any of aspects 1 through 6, wherein the non-linearity threshold is associated with the capability of the UE to process a maximum amount of non-linearity of downlink signals while maintaining a threshold signal-to-noise ratio loss.

Aspect 8: The method of any of aspects 1 through 7, wherein the capability of the UE to process non-linearity of downlink signals is based at least in part on a capability of an in-band non-linearity cancellation algorithm of the UE.

Aspect 9: The method of any of aspects 1 through 8, wherein the one or more characteristics of the downlink resource allocation comprises a modulation associated with the downlink resource allocation, an allocation bandwidth of the downlink resource allocation, or a combination thereof.

Aspect 10: The method of any of aspects 1 through 9, wherein the link quality metric comprises a link signal-to-noise ratio.

Aspect 11: A method for wireless communications at a network entity, comprising: transmitting one or more reference signals associated with a downlink resource allocation; receiving, from a UE, a report message that comprises at least a parameter indicating a non-linearity threshold associated with a capability of the UE to process non-linearity of downlink signals, wherein the parameter is based at least in part on a link quality metric and one or more characteristics of the downlink resource allocation measured by the UE; and transmitting one or more downlink messages in accordance with the downlink resource allocation and based at least in part on the parameter.

Aspect 12: The method of aspect 11, further comprising: receiving an indication of a capability of the UE to receive the one or more reference signals according to a first mode or a second mode, wherein the first mode is associated with the network entity transmitting reference signals with a first power level, and wherein the second mode is associated with the network entity transmitting reference signals with a second power level that is less than the first power level; and transmitting the reference signals according to the first mode or the second mode.

Aspect 13: The method of any of aspects 11 through 12, wherein the report message comprises a channel state feedback (CSF) report, and the CSF report comprises a channel quality indicator, a precoding matrix indicator, a rank indicator, or a combination thereof.

Aspect 14: The method of any of aspects 11 through 13, wherein the non-linearity threshold is associated with the capability of the UE to process a maximum amount of non-linearity of downlink signals while maintaining a threshold signal to noise ratio loss.

Aspect 15: The method of any of aspects 11 through 14, wherein the capability of the UE to process non-linearity of downlink signals is based at least in part on a capability of an in-band non-linearity cancellation algorithm of the UE.

Aspect 16: The method of any of aspects 11 through 15, wherein the one or more characteristics of the downlink resource allocation comprises a modulation associated with the downlink resource allocation, an allocation bandwidth of the downlink resource allocation, or a combination thereof.

Aspect 17: The method of any of aspects 11 through 16, wherein the link quality metric comprises a link signal-to-noise ratio.

Aspect 18: The method of any of aspects 11 through 17, further comprising: adjusting a power level of one or more power amplifiers at the network entity based at least in part on the parameter.

Aspect 19: An apparatus for wireless communications at a UE, comprising a processor; memory coupled with the processor; and instructions stored in the memory and executable by the processor to cause the apparatus to perform a method of any of aspects 1 through 10.

Aspect 20: An apparatus for wireless communications at a UE, comprising at least one means for performing a method of any of aspects 1 through 10.

Aspect 21: A non-transitory computer-readable medium storing code for wireless communications at a UE, the code comprising instructions executable by a processor to perform a method of any of aspects 1 through 10.

Aspect 22: An apparatus for wireless communications at a network entity, comprising a processor; memory coupled with the processor; and instructions stored in the memory and executable by the processor to cause the apparatus to perform a method of any of aspects 11 through 18.

Aspect 23: An apparatus for wireless communications at a network entity, comprising at least one means for performing a method of any of aspects 11 through 18.

Aspect 24: A non-transitory computer-readable medium storing code for wireless communications at a network entity, the code comprising instructions executable by a processor to perform a method of any of aspects 11 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      transmit an indication of a first capability of the UE to receive one or more reference signals according to a first mode or a second mode, wherein the first mode is associated with a network entity transmitting reference signals with a first power level, and wherein the second mode is associated with the network entity transmitting reference signals with a second power level that is less than the first power level;
      receive the one or more reference signals according to the first mode or the second mode and based at least in part on the first capability, wherein the one or more reference signals are associated with a downlink resource allocation;
      measure a link quality metric for the one or more reference signals;
      transmit a report message that comprises at least a parameter indicating a non-linearity threshold associated with a second capability of the UE to process non-linearity of downlink signals, wherein the parameter is based at least in part on the link quality metric and one or more characteristics of the downlink resource allocation; and
      receive one or more downlink messages in accordance with the downlink resource allocation and based at least in part on the parameter.

2. The apparatus of claim 1, wherein receiving the reference signals according to the first mode comprises calculating the link quality metric without performing a non-linearity cancellation process on the reference signals.

3. The apparatus of claim 1, wherein receiving the reference signals according to the second mode comprises calculating the link quality metric after performing a non-linearity cancellation process on the reference signals.

4. The apparatus of claim 1, wherein the instructions are further executable by the processor to cause the apparatus to:
   retrieve a value of the parameter from a table comprising a plurality of values of the link quality metric and a plurality of values of the one or more characteristics of the downlink resource allocation.

5. The apparatus of claim 1, wherein:
   the report message comprises a channel state feedback (CSF) report, and
   the CSF report comprises a channel quality indicator, a precoding matrix indicator, a rank indicator, or a combination thereof.

6. The apparatus of claim 1, wherein the non-linearity threshold is associated with the second capability of the UE to process a maximum amount of non-linearity of downlink signals while maintaining a threshold signal-to-noise ratio loss.

7. The apparatus of claim 1, wherein the second capability of the UE to process non-linearity of downlink signals is based at least in part on a third capability of an in-band non-linearity cancellation algorithm of the UE.

8. The apparatus of claim 1, wherein the one or more characteristics of the downlink resource allocation comprises a modulation associated with the downlink resource allocation, an allocation bandwidth of the downlink resource allocation, or a combination thereof.

9. The apparatus of claim 1, wherein the link quality metric comprises a link signal-to-noise ratio.

10. An apparatus for wireless communications at a network entity, comprising:
    a processor,
    memory coupled with the processor; and
    instructions stored in the memory and executable by the processor to cause the apparatus to:
       receive an indication of a first capability of a UE to receive one or more reference signals according to a first mode or a second mode, wherein the first mode is associated with the network entity transmitting reference signals with a first power level, and wherein the second mode is associated with the network entity transmitting reference signals with a second power level that is less than the first power level;
       transmit the one or more reference signals according to the first mode or the second mode based at least in part on the first capability, wherein the one or more reference signals are associated with a downlink resource allocation;
       receive, from a user equipment (UE), a report message that comprises at least a parameter indicating a non-linearity threshold associated with a second capability of the UE to process non-linearity of downlink signals, wherein the parameter is based at least in part on a link quality metric and one or more characteristics of the one or more reference signals measured by the UE; and
       transmit one or more downlink messages in accordance with the downlink resource allocation and based at least in part on the parameter.

11. The apparatus of claim 10, wherein:
    the report message comprises a channel state feedback (CSF) report, and
    the CSF report comprises a channel quality indicator, a precoding matrix indicator, a rank indicator, or a combination thereof.

12. The apparatus of claim 10, wherein the non-linearity threshold is associated with the second capability of the UE to process a maximum amount of non-linearity of downlink signals while maintaining a threshold signal to noise ratio loss.

13. The apparatus of claim 10, wherein the second capability of the UE to process non-linearity of downlink signals is based at least in part on a third capability of an in-band non-linearity cancellation algorithm of the UE.

14. The apparatus of claim 10, wherein the one or more characteristics of the downlink resource allocation comprises a modulation associated with the downlink resource allocation, an allocation bandwidth of the downlink resource allocation, or a combination thereof.

15. The apparatus of claim 10, wherein the link quality metric comprises a link signal-to-noise ratio.

16. The apparatus of claim 10, wherein the instructions are further executable by the processor to cause the apparatus to:

adjust a power level of one or more power amplifiers at the network entity based at least in part on the parameter.

17. A method for wireless communications at a user equipment (UE), comprising:

transmitting an indication of a first capability of the UE to receive one or more reference signals according to a first mode or a second mode, wherein the first mode is associated with a network entity transmitting reference signals with a first power level, and wherein the second mode is associated with the network entity transmitting reference signals with a second power level that is less than the first power level;

receiving the one or more reference signals according to the first mode or the second mode and based at least in part on the first capability, wherein the one or more reference signals are associated with a downlink resource allocation;

measuring a link quality metric for the one or more reference signals;

transmitting a report message that comprises at least a parameter indicating a non-linearity threshold associated with a second capability of the UE to process non-linearity of downlink signals, wherein the parameter is based at least in part on the link quality metric and one or more characteristics of the downlink resource allocation; and receiving one or more downlink messages in accordance with the downlink resource allocation and based at least in part on the parameter.

18. The method of claim 17, wherein receiving the reference signals according to the first mode comprises calculating the link quality metric without performing a non-linearity cancellation process on the reference signals.

19. The method of claim 17, wherein receiving the reference signals according to the second mode comprises calculating the link quality metric after performing a non-linearity cancellation process on the reference signals.

20. The method of claim 17, further comprising:

retrieving a value of the parameter from a table comprising a plurality of values of the link quality metric and a plurality of values of the one or more characteristics of the downlink resource allocation.

21. The method of claim 17, wherein:

the report message comprises a channel state feedback (CSF) report, and the CSF report comprises a channel quality indicator, a precoding matrix indicator, a rank indicator, or a combination thereof.

22. The method of claim 17, wherein the non-linearity threshold is associated with the second capability of the UE to process a maximum amount of non-linearity of downlink signals while maintaining a threshold signal-to-noise ratio loss.

23. The method of claim 17, wherein the second capability of the UE to process non-linearity of downlink signals is based at least in part on a third capability of an in-band non-linearity cancellation algorithm of the UE.

24. The method of claim 17, wherein the one or more characteristics of the downlink resource allocation comprises a modulation associated with the downlink resource allocation, an allocation bandwidth of the downlink resource allocation, or a combination thereof.

25. The method of claim 17, wherein the link quality metric comprises a link signal-to-noise ratio.

26. A method for wireless communications at a network entity, comprising:

receiving an indication of a first capability of a UE to receive one or more reference signals according to a first mode or a second mode, wherein the first mode is associated with the network entity transmitting reference signals with a first power level, and wherein the second mode is associated with the network entity transmitting reference signals with a second power level that is less than the first power level;

transmitting the one or more reference signals according to the first mode or the second mode based at least in part on the first capability, wherein the one or more reference signals are associated with a downlink resource allocation;

receiving, from a user equipment (UE), a report message that comprises at least a parameter indicating a non-linearity threshold associated with a second capability of the UE to process non-linearity of downlink signals, wherein the parameter is based at least in part on a link quality metric and one or more characteristics of the one or more reference signals measured by the UE; and transmitting one or more downlink messages in accordance with the downlink resource allocation and based at least in part on the parameter.

* * * * *